United States Patent
Kotaka et al.

(10) Patent No.: US 10,193,174 B2
(45) Date of Patent: Jan. 29, 2019

(54) FUEL CELL INTERNAL STATE DETECTION SYSTEM AND STATE DETECTION METHOD

(71) Applicant: NISSAN MOTOR CO., LTD., Yokohama-shi, Kanagawa (JP)

(72) Inventors: Toshikazu Kotaka, Kanagawa (JP); Tetsuya Aoki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/554,497

(22) PCT Filed: Mar. 3, 2015

(86) PCT No.: PCT/JP2015/056266
§ 371 (c)(1),
(2) Date: Aug. 30, 2017

(87) PCT Pub. No.: WO2016/139761
PCT Pub. Date: Sep. 9, 2016

(65) Prior Publication Data
US 2018/0048006 A1    Feb. 15, 2018

(51) Int. Cl.
*H01M 8/04537* (2016.01)
*H01M 8/04828* (2016.01)
(Continued)

(52) U.S. Cl.
CPC ..... *H01M 8/04641* (2013.01); *H01M 8/0485* (2013.01); *H01M 8/04529* (2013.01);
(Continued)

(58) Field of Classification Search
CPC ......... H01M 8/04537; H01M 8/04664; H01M 8/04641; H01M 8/04671; H01M 8/04552; H01M 8/04582; H01M 2250/20
See application file for complete search history.

(56) References Cited

U.S. PATENT DOCUMENTS 9,917,315 B2 *   3/2018   Aoki ................ H01M 8/04447
2006/0062982 A1   3/2006   Hammond Cunningham et al.
(Continued)

FOREIGN PATENT DOCUMENTS

EP     2 908 149 B1    8/2015
JP     2002-367650 A    12/2002
(Continued)

OTHER PUBLICATIONS

USPTO Notice of Allowance, U.S. Appl. No. 15/554,242, dated Jul. 13, 2018, 10 pages.
(Continued)

*Primary Examiner* — Alexander Usyatinsky
(74) *Attorney, Agent, or Firm* — Foley & Lardner LLP

(57) ABSTRACT

A fuel cell internal state detection system includes estimation object state quantity setting unit for setting a suitable estimation object state quantity as an index of an internal state, an impedance value acquisition unit configured to obtain an impedance value of a fuel cell, an impedance usability judging unit configured to judge whether or not the obtained impedance value is usable for the calculation of the estimation object state quantity, estimation object state quantity calculation unit for calculating the estimation object state quantity set by the estimation object state quantity setting unit on the basis of the obtained impedance value when the impedance value is judged to be usable for the calculation of the estimation object state quantity by the impedance usability judging unit, and an unusable-scene process execution unit configured to perform an unusable-scene process when the impedance value is judged not to be usable for the calculation of the estimation object state quantity by the impedance usability judging unit.

11 Claims, 31 Drawing Sheets

(51) Int. Cl.
*H01M 8/04492* (2016.01)
*H01M 8/04858* (2016.01)
*H01M 8/04664* (2016.01)
*H01M 8/1018* (2016.01)

(52) U.S. Cl.
CPC ... *H01M 8/04552* (2013.01); *H01M 8/04582* (2013.01); *H01M 8/04634* (2013.01); *H01M 8/04671* (2013.01); *H01M 8/04949* (2016.02); *H01M 2008/1095* (2013.01); *H01M 2250/20* (2013.01)

(56) References Cited

U.S. PATENT DOCUMENTS

| | | | |
|---|---|---|---|
| 2010/0264930 A1* | 10/2010 | Kawase | H01M 8/04246 324/430 |
| 2011/0269046 A1 | 11/2011 | Suematsu | |
| 2012/0145564 A1* | 6/2012 | Yamazaki | H01M 8/04641 205/790.5 |
| 2013/0149628 A1 | 6/2013 | Ogawa et al. | |
| 2013/0244127 A1 | 9/2013 | Maeshima et al. | |
| 2013/0248106 A1 | 9/2013 | Hisamitsu et al. | |
| 2013/0330646 A1* | 12/2013 | Aoki | H01M 8/04119 429/450 |
| 2015/0276888 A1 | 10/2015 | Sakai | |
| 2018/0053952 A1 | 2/2018 | Kotaka et al. | |

FOREIGN PATENT DOCUMENTS

| | | |
|---|---|---|
| JP | 2002367650 * | 12/2002 |
| JP | 4640661 B2 | 3/2011 |
| JP | 2012-78339 A | 4/2012 |
| JP | 201278339 * | 4/2012 |
| JP | 2013-191362 A | 9/2013 |
| JP | 2013-258042 A | 12/2013 |
| JP | 2014-229528 A | 12/2014 |
| WO | WO 2013/088463 A1 | 6/2013 |
| WO | WO 2014/057868 A1 | 4/2014 |

OTHER PUBLICATIONS

USPTO Office Action, U.S. Appl. No. 15/554,242, dated Mar. 9, 2018, 9 pages.

* cited by examiner

|  | WET/DRY STATE | HYDROGEN AMOUNT | OXYGEN AMOUNT |
|---|---|---|---|
| ELECTROLYTE MEMBRANE RESISTANCE VALUE + IONOMER RESISTANCE VALUE | ○ | — | — |
| IONOMER RESISTANCE VALUE | ○ | — | — |
| ELECTRICAL DOUBLE LAYER CAPACITANCE VALUE | — | ○ | — |
| REACTION RESISTANCE VALUE OF ANODE ELECTRODE | — | ○ | — |
| REACTION RESISTANCE VALUE OF CATHODE ELECTRODE | — | — | ○ |

FIG.5

FUEL CELL INTERNAL STATE DETECTION SYSTEM AND STATE DETECTION METHOD

TECHNICAL FIELD

This invention relates to a fuel cell internal state detection system and an internal state detection method.

BACKGROUND ART

It is known to detect various internal states such as excess and deficiency of hydrogen, excess and deficiency of oxygen and a degree of wetness of an electrolyte membrane in a fuel cell. For example, to detect excess and deficiency of hydrogen, it is known to use a reaction resistance value of a hydrogen electrode (anode electrode) as an index of this detection. Further, to detect a wet/dry state of the electrolyte membrane, a state quantity such as an electrolyte membrane resistance value or an ionomer resistance value may be used as an index.

In estimating/calculating the above state quantity, it is known to measure and use an impedance value.

For example, in JP2013-258042, it is proposed to calculate an ionomer resistance value on the basis of an equation supposed in advance from an imaginary part of a measured impedance and use this ionomer resistance value as an index for the detection of a wet/dry state of a fuel cell.

SUMMARY OF INVENTION

However, the equation supposed in advance for the calculation of the ionomer resistance value in JP2013-258042 assumes that the measured impedance value belongs to a straight part of an impedance curve in a so-called Nyquist diagram.

Accordingly, if the impedance value belongs to an arcuate part of the Nyquist diagram, an error between the calculated ionomer resistance value and an actual value becomes large, with the result that accuracy in detecting the wet/dry state of the electrolyte membrane is thought to be reduced.

The present invention was developed while focusing on such a problem, and aims to provide a fuel cell internal state detection system and an internal state detection method capable of highly accurately detecting an internal state of a fuel cell.

According to one aspect of the present invention, a fuel cell internal state detection system for detecting an internal state of a fuel cell on the basis of an impedance value of the fuel cell is provided. Further, the fuel cell internal state detection system includes an estimation object state quantity setting unit configured to set an estimation object state quantity as an index of the internal state, an impedance value acquisition unit configured to obtain the impedance value of the fuel cell, an impedance usability judging unit configured to judge whether or not the obtained impedance value is usable for a calculation of the estimation object state quantity, an estimation object state quantity calculation unit configured to calculate the estimation object state quantity set by the estimation object state quantity setting unit on the basis of the obtained impedance value when the impedance value is judged to be usable for the calculation of the estimation object state quantity by the impedance usability judging unit, and an unusable-scene process execution unit configured to perform an unusable-scene process when the impedance value is judged not to be usable for the calculation of the estimation object state quantity by the impedance usability judging unit.

BRIEF DESCRIPTION OF DRAWINGS

FIG. 5 is a diagram showing an internal state-state quantity table of the fuel cell according to the one embodiment.

DESCRIPTION OF EMBODIMENTS

Hereinafter, embodiments of the present invention are described with reference to the drawings and the like.

A unit cell of a fuel cell is configured so that an electrolyte membrane is sandwiched by an anode electrode serving as a fuel electrode and a cathode electrode serving as an oxidant electrode. The unit cell of the fuel cell generates power using anode gas containing hydrogen which is supplied to the anode electrode and cathode gas containing oxygen which is supplied to the cathode electrode. Electrode reactions which proceed in both anode and cathode electrodes are as follows.

Anode electrode: $2H_2 \rightarrow 4H^+ + 4e^-$     (1)

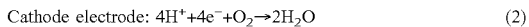
Cathode electrode: $4H^+ + 4e^- + O_2 \rightarrow 2H_2O$     (2)

The unit cell of the fuel cell generates an electromotive force of about 1 V (volt) by these electrode reactions (1), (2).

Figure 1:
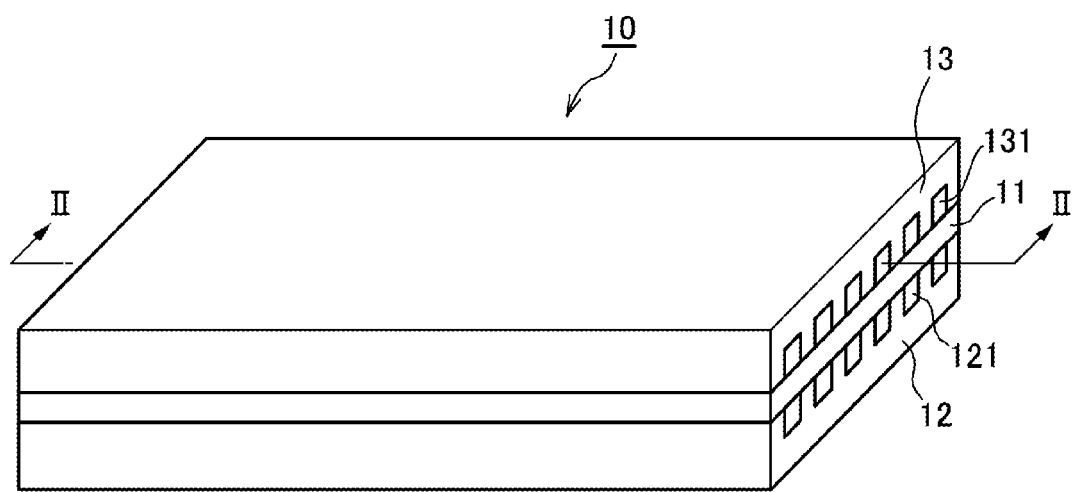
FIG. 1 is a perspective view of a fuel cell according to one embodiment of the present invention.
Figure 2:
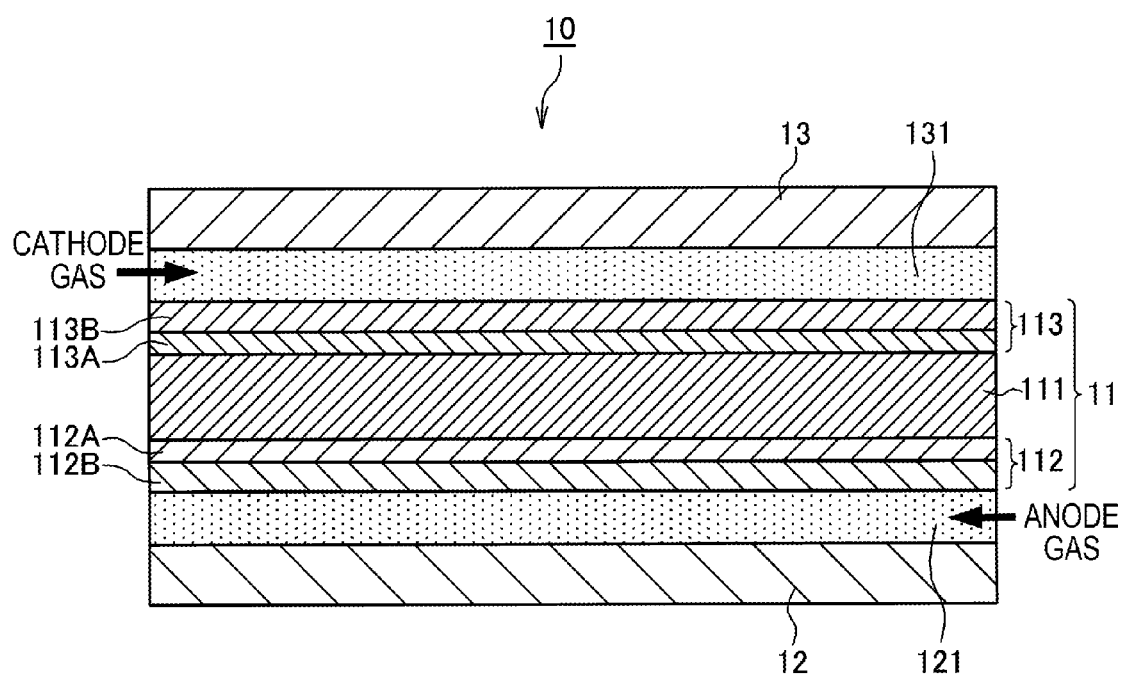
FIG. 2 is a sectional view along II-II of the fuel cell of FIG. 1.

FIGS. 1 and 2 are views showing the configuration of a unit cell of the fuel cell 10 according to one embodiment of the present invention. FIG. 1 is a perspective view of the unit cell of the fuel cell 10. FIG. 2 is a sectional view along II-II of the unit cell of the fuel cell 10 of FIG. 1.

As shown in FIGS. 1 and 2, the unit cell of the fuel cell 10 includes a membrane electrode assembly (MEA) 11, and an anode separator 12 and a cathode separator 13 arranged to sandwich the MEA 11, The MEA 11 is composed of an electrolyte membrane 111, an anode electrode 112 and a cathode electrode 113. The MEA 11 includes the anode electrode 112 on one surface side of the electrolyte membrane 111 and the cathode electrode 113 on the other surface side.

The electrolyte membrane 111 is a proton conductive ion exchange membrane formed of fluororesin. The electrolyte membrane 111 exhibits good electrical conductivity in a wet state. It should be noted that another material such as a material having phosphoric acid ($H_3PO_4$) impregnated in a predetermined matrix may be used as the electrolyte member 111 depending on compatibility with the supposed fuel cell.

The anode electrode 112 includes a catalyst layer 112A and a gas diffusion layer 112B. The catalyst layer 112A is a member formed of Pt or carbon black particles carrying Pt or the like and is provided in contact with the electrolyte membrane 111. The gas diffusion layer 112B is provided on an outer side of the catalyst layer 112A. The gas diffusion layer 112B is a member formed of carbon cloth or carbon paper having gas diffusion properties and electrical conductivity and is provided in contact with the catalyst layer 112A and the anode separator 12.

Similarly to the anode electrode 112, the cathode electrode 113 also includes a catalyst layer 113A and a gas diffusion layer 113B. The catalyst layer 113A is arranged between the electrolyte membrane 111 and the gas diffusion layer 113B and the gas diffusion layer 113B is arranged between the catalyst layer 113A and the cathode separator 13.

The anode separator 12 is arranged on an outer side of the gas diffusion layer 112B. The anode separator 12 includes a plurality of anode gas flow passages 121 for supplying anode gas (hydrogen gas) to the anode electrode 112. The anode gas flow passages 121 are formed as groove-like passages.

The cathode separator 13 is arranged on an outer side of the gas diffusion layer 113B. The cathode separator 13 includes a plurality of cathode gas flow passages 131 for supplying cathode gas (air) to the cathode electrode 113. The cathode gas flow passages 131 are formed as groove-like passages.

The anode separator 12 and the cathode separator 13 are configured so that the anode gas flowing in the anode gas flow passages 121 and the cathode gas flowing in the cathode gas flow passages 131 flow in directions opposite to each other. It should be noted that the anode separator 12 and the cathode separator 13 may be configured so that these gases flow in the same direction.

In the case of using such a unit cell of the fuel cell 10 as a power source for an automobile, a fuel cell stack in which several hundreds of unit cells of the fuel cell 10 are laminated is used since the required power is large. Power for driving the vehicle is taken out by configuring a fuel cell system that supplies anode gas and cathode gas to the fuel cell stack.

Figure 3:
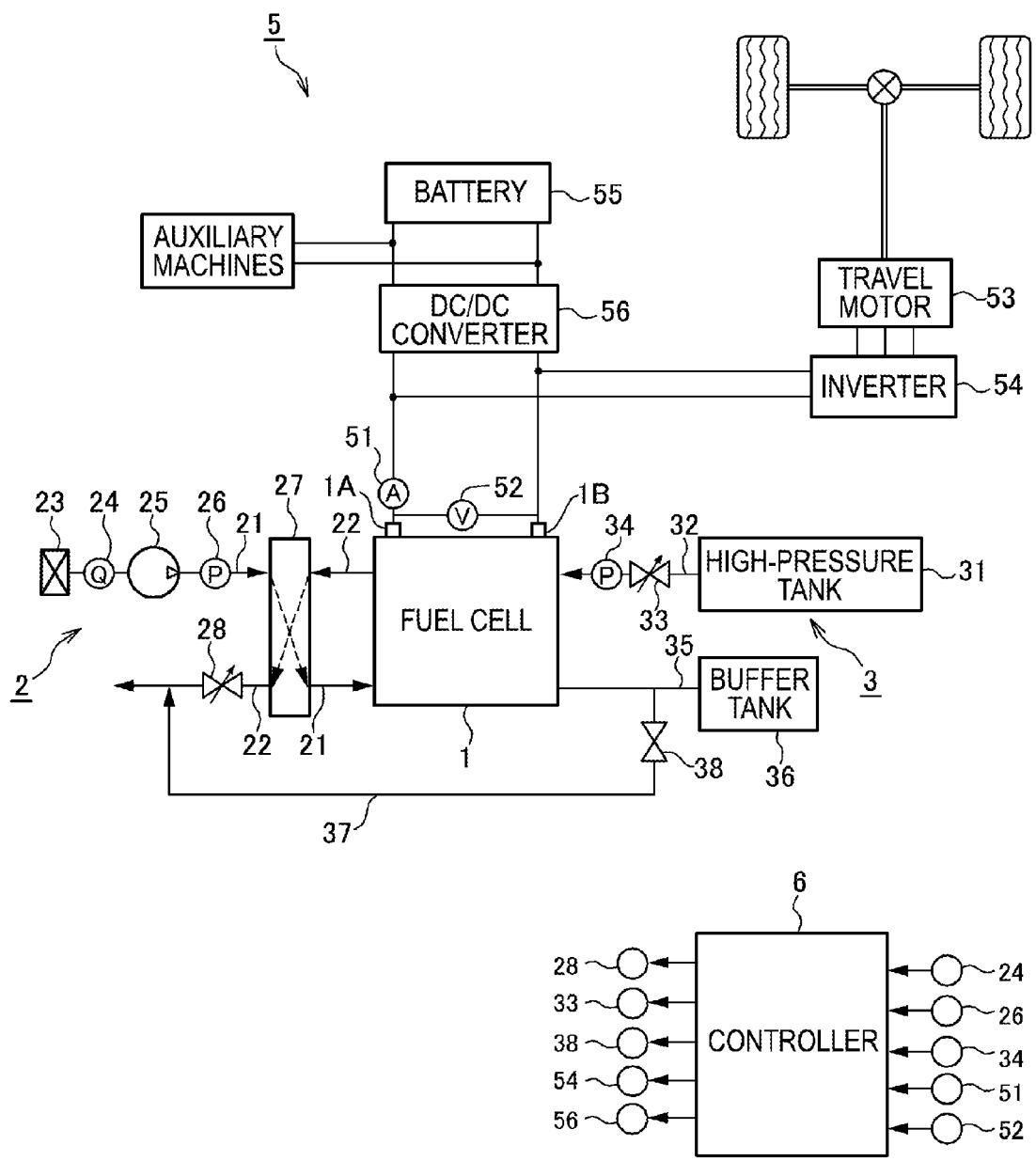
FIG. 3 is a schematic configuration diagram of a fuel cell system according to the one embodiment of the present invention.

FIG. 3 is a schematic diagram of a fuel cell system 100 according to one embodiment of the present invention.

The fuel cell system 100 includes a fuel cell 1, a cathode gas supplying/discharging device 2, an anode gas supplying/discharging device 3, a power system 5 and a controller 6.

The fuel cell 1 is a laminated battery formed by laminating a plurality of unit cells of the fuel cell 10 as described above. The fuel cell 1 generates power necessary to drive a vehicle upon receiving the supply of the anode gas and the cathode gas. The fuel cell 1 includes an anode electrode side terminal 1A and a cathode electrode side terminal 1B as output terminals for taking out power.

The cathode gas supplying/discharging device 2 supplies the cathode gas to the fuel cell 1 and discharges cathode off-gas discharged from the fuel cell 1 to outside. The cathode gas supplying/discharging device 2 includes a cathode gas supply passage 21, a cathode gas discharge passage 22, a filter 23, an air flow sensor 24, a cathode compressor 25, a cathode pressure sensor 26, a water recovery device (WRD) 27 and a cathode pressure control valve 28.

The cathode gas supply passage 21 is a passage through which the cathode gas to be supplied to the fuel cell 1 flows. One end of the cathode gas supply passage 21 is connected to the filter 23 and the other end is connected to a cathode gas inlet part of the fuel cell 1.

The cathode gas discharge passage 22 is a passage through which the cathode off-gas discharged from the fuel cell 1 flows. One end of the cathode gas discharge passage 22 is connected to a cathode gas outlet part of the fuel cell 1 and the other end is formed as an opening end. The cathode off-gas is a mixture gas containing the cathode gas, steam produced by the electrode reaction and the like.

The filter 23 is a member for removing dust, dirt and the like contained in the cathode gas to be taken into the cathode gas supply passage 21.

The cathode compressor 25 is provided in the cathode gas supply passage 21 downstream of the filter 23. The cathode compressor 25 supplies the cathode gas in the cathode gas supply passage 21 to the fuel cell 1 by feeding the cathode gas under pressure.

The air flow sensor 24 is provided between the filter 23 and the cathode compressor 25 in the cathode gas supply passage 21. The air flow sensor 24 detects a flow rate of the cathode gas to be supplied to the fuel cell 1.

The cathode pressure sensor 26 is provided in the cathode gas supply passage 21 between the cathode compressor 25 and the WRD 27. The cathode pressure sensor 26 detects a pressure of the cathode gas to be supplied to the fuel cell 1. The cathode gas pressure detected by the cathode pressure sensor 26 represents a pressure of an entire cathode system including the cathode gas flow passages of the fuel cell 1 and the like.

The WRD 27 is connected over the cathode gas supply passage 21 and the cathode gas discharge passage 22. The WRD 27 is a device for recovering moisture from the cathode off-gas flowing in the cathode gas discharge passage 22 and humidifying the cathode gas flowing in the cathode gas supply passage 21 using that recovered moisture.

The cathode pressure control valve 28 is provided in the cathode gas discharge passage 22 downstream of the WRD 27. The cathode pressure control valve 28 is controlled to open and close by the controller 6 and adjusts the pressure of the cathode gas to be supplied to the fuel cell 1.

Next, the anode gas supplying/discharging device 3 is described.

The anode gas supplying/discharging device 3 supplies anode gas to the fuel cell 1 and discharges anode off-gas discharged from the fuel cell 1 to the cathode gas discharge passage 22. The anode gas supplying/discharging device 3 includes a high-pressure tank 31, an anode gas supply passage 32, an anode pressure control valve 33, an anode pressure sensor 34, an anode gas discharge passage 35, a buffer tank 36, a purge passage 37 and a purge valve 38.

The high-pressure tank 31 is a container for storing the anode gas to be supplied to the fuel cell 1 in a high-pressure state.

The anode gas supply passage 32 is a passage for supplying the anode gas discharged from the high-pressure tank 31 to the fuel cell 1. One end of the anode gas supply passage 32 is connected to the high-pressure tank 31 and the other end is connected to an anode gas inlet part of the fuel cell 1.

The anode pressure control valve 33 is provided in the anode gas supply passage 32 downstream of the high-pressure tank 31. The anode pressure control valve 33 is controlled to open and close by the controller 6 and adjusts a pressure of the anode gas to be supplied to the fuel cell 1.

The anode pressure sensor 34 is provided in the anode gas supply passage 32 downstream of the anode pressure control valve 33. The anode pressure sensor 34 detects a pressure of the anode gas to be supplied to the fuel cell 1. The anode gas pressure detected by the anode pressure sensor 34 represents a pressure of an entire anode system including the buffer tank 36, the anode gas flow passages of the fuel cell 1 and the like.

The anode gas discharge passage 35 is a passage through which the anode off-gas discharged from the fuel cell 1 flows. One end of the anode gas discharge passage 35 is connected to an anode gas outlet part of the fuel cell 1 and the other end is connected to the buffer tank 36. The anode off-gas contains the anode gas not used in the electrode reaction, impurity gas such as nitrogen that has leaked from the cathode gas flow passages 131 to the anode gas flow passages 121, moisture and the like.

The buffer tank 36 is a container for temporarily storing the anode off-gas flowing from the anode gas discharge passage 35. The anode off-gas pooled in the buffer tank 36 is discharged to the cathode gas discharge passage 22 through the purge passage 37 when the purge valve 38 is opened.

The purge passage 37 is a passage for discharging the anode off-gas. One end of the purge passage 37 is connected to the anode gas discharge passage 35 and the other end is connected to a part of the cathode gas discharge passage 22 downstream of the cathode pressure control valve 28.

The purge valve 38 is provided in the purge passage 37. The purge valve 38 is controlled to open and close by the controller 6 and controls a purge flow rate of the anode off-gas discharged from the anode gas discharge passage 35 to the cathode gas discharge passage 22.

When a purge control is executed to open the purge valve 38, the anode off-gas is discharged to outside through the purge passage 37 and the cathode gas discharge passage 22. At this time, the anode off-gas is mixed with the cathode off-gas in the cathode gas discharge passage 22. By mixing the anode off-gas and the cathode off-gas and discharging the mixture gas to outside in this way, an anode gas concentration (hydrogen concentration) in the mixture gas is set at a value equal to or lower than an allowable discharge concentration.

The power system 5 includes a current sensor 51, a voltage sensor 52, a travel motor 53, an inverter 54, a battery 55 and a DC/DC converter 56.

The current sensor 51 detects an output current extracted from the fuel cell 1. The voltage sensor 52 detects an output voltage of the fuel cell 1, i.e. an inter-terminal voltage between the anode electrode side terminal 1A and the cathode electrode side terminal 1B. It should be noted that the voltage sensor 52 may be configured to detect a voltage of each unit cell of the fuel cell 10 or may be configured to detect a voltage of each group composed of a plurality of unit cells of the fuel cell 10.

The travel motor 53 is a three-phase alternating-current synchronous motor and a drive source for driving wheels. The travel motor 53 has a function serving as a motor to be rotationally driven upon receiving the supply of power from the fuel cell 1 and the battery 55 and a function serving as a generator for generating power by being rotationally driven by an external force.

The inverter 54 is composed of a plurality of semiconductor switches such as IGBTs. The semiconductor switches of the inverter 54 are switching-controlled by the controller 6, thereby converting direct-current power into alternating-current power or alternating-current power into direct-current power. The inverter 54 converts the composite direct-current power of the output power of the fuel cell 1 and the output power of the battery 55 into three-phase alternating-current power and supplies this power to the travel motor 53 when the travel motor 53 is caused to function as a motor.

In contrast, the inverter 54 converts the regenerative power (three-phase alternating-current power) of the travel motor 53 into direct-current power and supplies this power to the battery 55 when the travel motor 53 is caused to function as a generator.

The battery 55 is configured to be charged with a surplus of the output power of the fuel cell 1 and the regenerative power of the travel motor 53. The power charged into the battery 55 is supplied to the travel motor 53 and auxiliary machines such as the cathode compressor 25 if necessary.

The DC/DC converter 56 is a bidirectional voltage converter for increasing and decreasing the output voltage of the fuel cell 1. By controlling the output voltage of the fuel cell 1 by the DC/DC converter 56, the output current of the fuel cell 1 and the like are adjusted.

The controller 6 is configured by a microcomputer including a central processing unit (CPU), a read-only memory (ROM), a random access memory (RAM) and an input/output interface (I/O interface). Signals from various sensors such as the current sensor 51 and the voltage sensor 52 as well as signals from sensors such as an accelerator stroke sensor (not shown) for detecting a depressed amount of an accelerator pedal are input to the controller 6.

The controller 6 adjusts the pressures and flow rates of the anode gas and the cathode gas to be supplied to the fuel cell 1 by controlling the anode pressure control valve 33, the cathode pressure control valve 28, the cathode compressor 25 and the like according to an operating state of the fuel cell system 100.

Further, the controller 6 calculates target output power of the fuel cell 1 on the basis of the operating state of the fuel cell system 100. Further, the controller 6 calculates the target output power on the basis of power required by the travel motor 53, power required by the auxiliary machines such as the cathode compressor 25, charge/discharge requests of the battery 55 and the like.

Furthermore, the controller 6 calculates a target output current of the fuel cell 1 on the basis of the calculated target output power described above by referring to an IV characteristic (current-voltage characteristic) of the fuel cell 1 determined in advance. Then, the controller 6 controls the output voltage of the fuel cell 1 by the DC/DC converter 56 so that the output current of the fuel cell 1 reaches the target output current, and executes a control to supply a necessary current to the travel motor 53 and the auxiliary machines.

Further, the controller 6 controls the cathode compressor 25 and the like so that the degree of wetness (water contents) of each electrolyte membrane 111 and the catalyst layers 112A, 113A of the fuel cell 1 are in a state suitable for power generation.

Furthermore, in the present embodiment, the controller 6 superimposes an alternating-current signal of a predetermined frequency on the outer current and the output voltage of the fuel cell 1 in measuring an impedance of the fuel cell 1.

This controller 6 calculates an impedance value Z of the fuel cell 1 at a predetermined frequency by dividing a voltage value obtained by applying a Fourier transform to a value obtained by superimposing the alternating-current signal of the predetermined frequency on a control voltage of the fuel cell 1 by a voltage value obtained by applying a Fourier transform to a response output current value.

Further, in the present embodiment, an internal state-state quantity table representing a relationship between internal states of the fuel cell 1 such as a wet/dry state, a hydrogen deficiency state and an oxygen deficiency state and state quantities such as a reaction resistance and an electrical double layer capacitance, which are indices of these internal states, is stored in an unillustrated memory of the controller 6.

It should be noted that it is known that there is a relationship of $\omega=2\pi f$ between a "frequency f" and an "angular frequency $\omega$", and there is only a difference multiplied by a dimensionless constant $2\pi$ between these. Thus, the "frequency" and the "angular frequency" are identified with each other and a symbol "$\omega$" of is used to express both to facilitate the description below. Further, a process of each step in the following first to eleventh embodiments is performed by the controller 6 except in particularly clearly expressed cases.

(First Embodiment)

Figure 4:
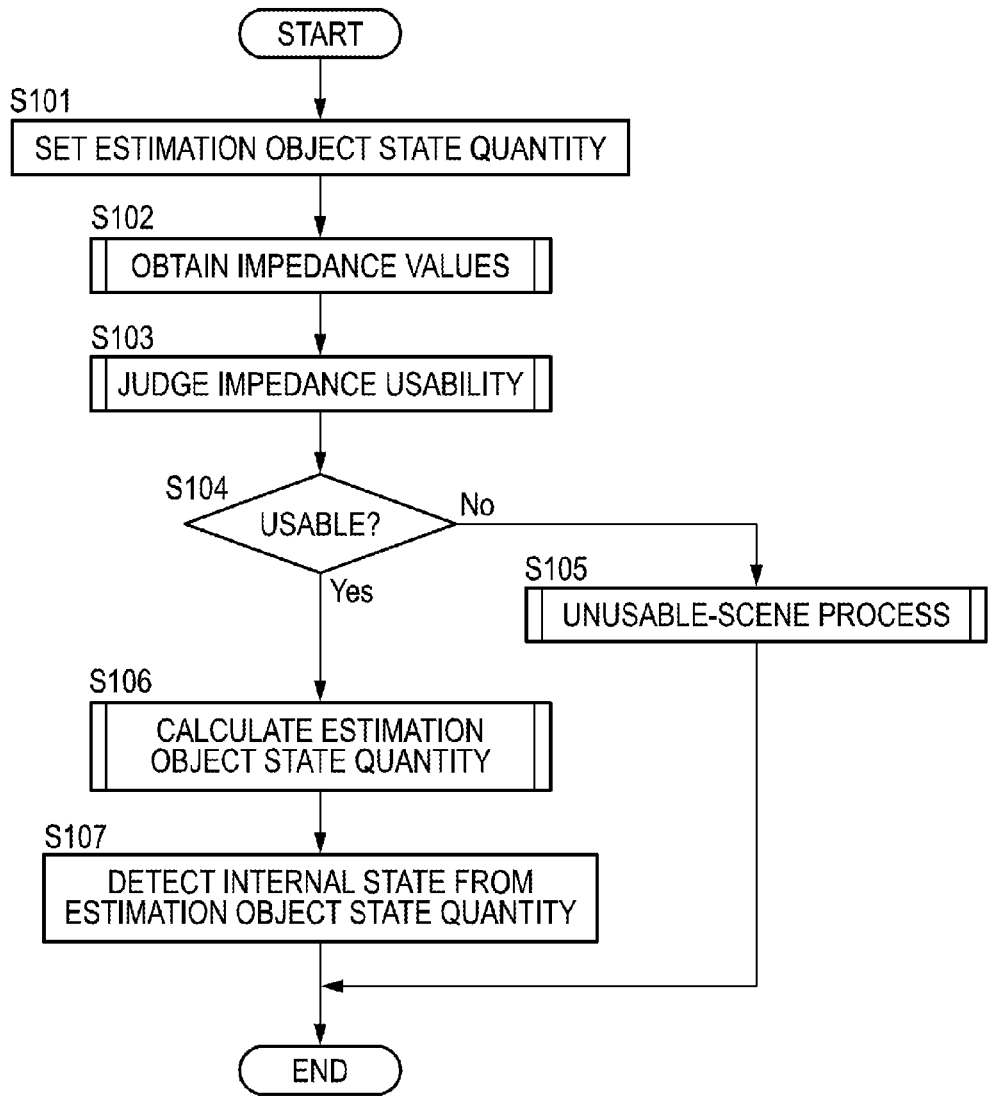
FIG. 4 is a flow chart showing the flow of a fuel cell internal state detection system according to one embodiment.

FIG. 4 is a flow chart showing the flow of a fuel cell internal state detection system according to the present embodiment.

In Step S101, a suitable estimation object state quantity is set as an index of an internal state of a fuel cell 1 in the present embodiment as shown in FIG. 4. Specifically, in setting this estimation object state quantity, a state quantity corresponding to a desired internal state of the fuel cell 1 is extracted from the aforementioned internal state-state quantity table on the basis of the internal state of the fuel cell 1 and this extracted state quantity is set as the estimation object state quantity.

FIG. 5 shows an example of the internal state-state quantity table. In FIG. 5, a wet/dry state (degree of wetness), a hydrogen amount and an oxygen amount are shown as examples of the internal state of the fuel cell 1. Here, the wet/dry state means a degree of wetness w, which is a numerical value indicating how much moisture is included in the electrolyte membrane 111 and the catalyst layers 112A, 113A and at least either one of an electrolyte membrane resistance and an ionomer resistance is determined as the state quantity serving as an index of this wet/dry state.

The hydrogen amount is a numerical value representing an excess/deficiency state of anode gas, which is fuel, and the electrical double layer capacitance and the reaction resistance value of the anode electrode 112 are determined as state quantities serving as indices of this hydrogen amount. Further, the oxygen amount is a numerical value representing an excess/deficiency state of cathode gas, and the reaction resistance value of the cathode electrode 113 is determined as a state quantity serving as an index of this oxygen amount.

It should be noted that to specify which state quantity is appropriate as the index of the state quantity to be detected in this way is appropriately set on the basis of experimental data or the like. Thus, it is not limited to the above internal state-state quantity table.

Subsequently, in Step S102, an impedance value Z of the fuel cell 1 is obtained. In the present embodiment, three impedance values $Z(\omega_1)$, $Z(\omega_2)$ and $Z(\omega_3)$ are obtained particularly at three frequencies $\omega_1$, $\omega_2$ and $\omega_3$ (several Hz to several tens of thousands of Hz, $\omega_1<\omega_2<\omega_3$). This is described in detail below.

Figure 6:
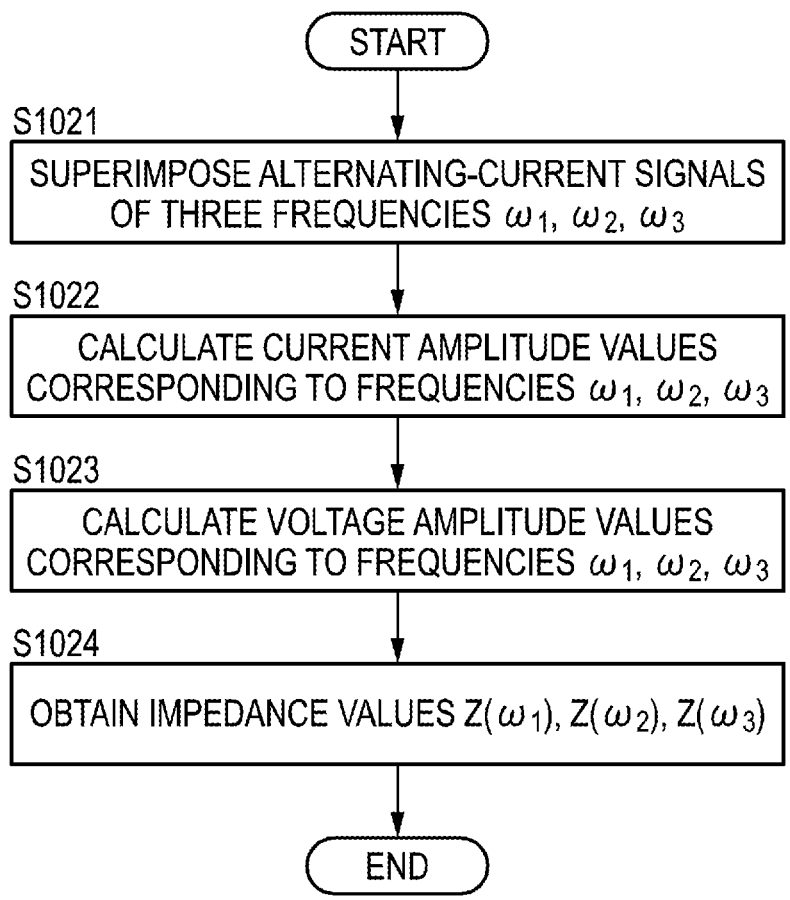
FIG. 6 is a flow chart showing the flow of obtaining impedance values according to the one embodiment.

FIG. 6 is a flow chart showing the flow of measuring the impedance values. The measurement of the impedance values according to the present embodiment is conducted in accordance with Steps S1021 to S1024 shown in FIG. 6.

First, in Step S1021, a DC/DC converter 56 is controlled to superimpose signals of three frequencies $\omega_1$, $\omega_2$ and $\omega_3$ on either one of an output current and an output voltage output from the fuel cell 1 at an impedance measurement timing.

In Step S1022, a Fourier transform is applied to each output current value $I_{out}$ measured by the current sensor 51 in the case of superimposing alternating-current signals of the frequencies $\omega_1$, $\omega_2$ and $\omega_3$, and current amplitude values $I_{out}(\omega_1)$, $I_{out}(\omega_2)$ and $I_{out}(\omega_3)$ are calculated.

In Step S1023, a Fourier transform is applied to the output voltage values $V_{out}$ measured by the voltage sensor 52 in the case of superimposing the alternating-voltage signals of the frequencies $\omega_1$, $\omega_2$ and $\omega_3$, and voltage amplitude values $V_{out}(\omega_1)$, $V_{out}(\omega_2)$ and $V_{out}(\omega_3)$ are calculated.

In Step S1024, the voltage amplitude values $V_{out}(\omega_1)$, $V_{out}(\omega_2)$ and $V_{out}(\omega_3)$ are respectively divided by the current amplitude values $I_{out}(\omega_1)$, $I_{out}(\omega_2)$ and $I_{out}(\omega_3)$ to calculate the impedances $Z(\omega_1)$, $Z(\omega_2)$ and $Z(\omega_3)$.

Subsequently, referring back to FIG. 4, the usability of the impedance values is judged in Step S103.

Here, that the calculated impedance value is usable means that the estimation object state quantity calculated on the basis of this impedance value has a certain accuracy so as to be within a permissible margin of error with respect to an actual value. It should be noted that the magnitude of the permissible margin of error is not necessarily determined since this magnitude is determined depending on various situations. However, it is, for example, supposed that the calculated estimation object state quantity is of a magnitude that will deviate from the actual value by several % or less.

Particularly, in the present embodiment, an impedance curve of the fuel cell 1 specified on the complex plane is known to form an arc region $L_c$ on a low frequency side and a non-arc region $L_{nc}$ (substantially straight area) on a high frequency side. Thus, whether or not the above estimation object state quantity is usable is judged on the basis of whether each of the obtained impedance values $Z(\omega_1)$, $Z(\omega_2)$ and $Z(\omega_3)$ is located on the arc region $L_c$ on the low frequency side or on the non-arc region $L_{nc}$ on the high frequency side.

A mode of determining whether each of the obtained impedance values $Z(\omega_1)$, $Z(\omega_2)$ and $Z(\omega_3)$ belongs to the arc region $L_c$ or to the non-arc region $L_{nc}$ in the present embodiment is described below.

Figure 7:
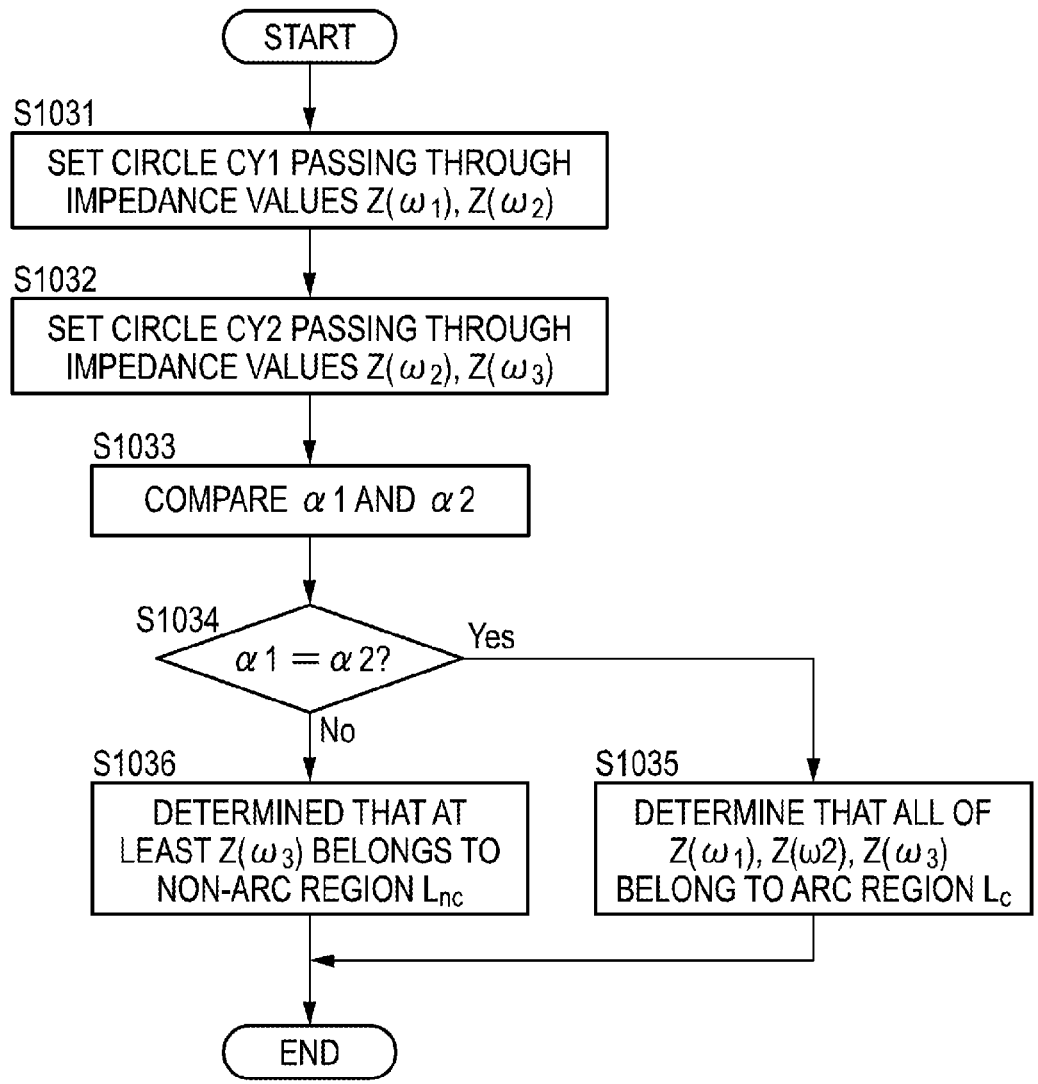
FIG. 7 is a flow chart showing the flow of determining whether the impedance values belong to an arc region or to a non-arc region in the one embodiment.

FIG. 7 is a flow chart showing the flow of determining whether the impedance values $Z(\omega_1)$, $Z(\omega_2)$ and $Z(\omega_3)$ belong to the arc region $L_c$ or to the non-arc region $L_{nc}$ of the impedance curve in the present embodiment.

In Step S1031, a circle CY1 (see FIG. 9) connecting the impedance values $Z(\omega_1)$ and $Z(\omega_2)$ is set on the complex plane. This specific method is described.

Figure 8:
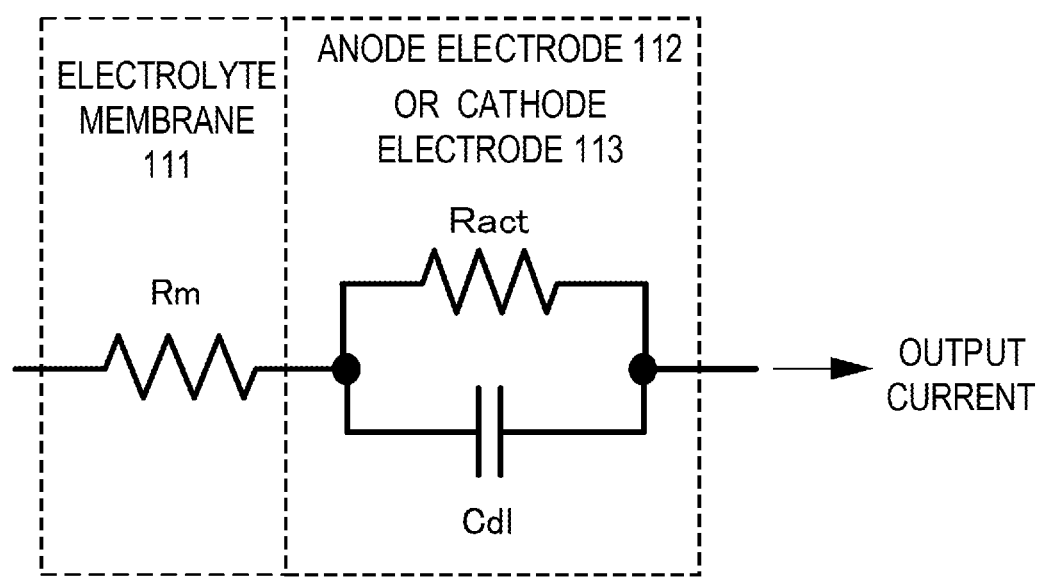
FIG. 8 is a diagram showing an equivalent circuit of the fuel cell.

FIG. 8 is a diagram showing a simplified equivalent circuit of a unit cell of the fuel cell 10. This simplified equivalent circuit is a circuit designed to simplify a model by omitting circuit elements such as an electron transport resistance and a contact resistance in the actual fuel cell 1 and particularly considering only either one of an electrolyte membrane resistance, a reaction resistance of the anode electrode 112 or the cathode electrode 113 and either one of electrical double layer capacitances of both electrodes as main circuit elements of the fuel cell 1.

Here, the impedance (written also as a simplified circuit impedance below) Z of the fuel cell 1 based on the equivalent circuit model of FIG. 8 is given by the following equation:

[Equation 1]

$$Z = R_m + \frac{R_{act}(1 - j\omega C_{dl}R_{act})}{1 + \omega^2 C_{dl}^2 R_{act}^2} \qquad (1)$$

If a real component of this Equation (1) is taken and transformed, an electrolyte membrane resistance value $R_m$ is expressed as follows.

[Equation 2]

$$R_m = Z_{re} - \frac{R_{act}}{1 + \omega^2 C_{dl}^2 R_{act}^2} \qquad (2)$$

Further, if an imaginary component of Equation (1) is taken, the following equation is obtained.

[Equation 3]

$$-\frac{1}{\omega Z_{im}} = \frac{1}{\omega^2 C_{dl} R_{act}^2} + C_{dl} \qquad (3)$$

$Z_{re}$, $Z_{im}$ respectively mean the real component and the imaginary component of the impedance of the fuel cell 1, $\omega$ means the angular frequency of the alternating-current signal, $R_{act}$ means the reaction resistance value of the anode electrode 112 or the cathode electrode 113 and $C_{dl}$ means the electrical double layer capacitance value of the anode electrode 112 or the cathode electrode 113.

Accordingly, if sets $(Z_{re1}(\omega_1), Z_{im1}(\omega_1))$, $(Z_{re2}(\omega_2), Z_{im2}(\omega_2))$ of the real components and the imaginary components of the obtained two impedance values $Z(\omega_1)$ and $Z(\omega_2)$ described above are obtained, unknowns $C_{dl}$ and $R_{act}$ can be obtained on the basis of Equations (2) and (3). Thus, the circle CY1 is determined if the obtained unknowns $C_{dl}$ and $R_{act}$ are applied to Equation (1). Specifically, the circle CY1 can be uniquely determined by the two impedance values $Z(\omega_1)$ and $Z(\omega_2)$.

In Step S1032, a circle CY2 (see FIG. 9 and the like) connecting the impedance values $Z(\omega_2)$ and $Z(\omega_3)$ is set on the complex plane. It should be noted that a specific determination method for the circle CY2 is similar as in the case of the circle CY1 and the circle CY2 can also be uniquely determined by these two impedance values $Z(\omega_2)$ and $Z(\omega_3)$.

In Step S1033, a coordinate $\alpha 1$ of an intersection of the circle CY1 and a real axis and a coordinate $\alpha 2$ of an intersection of the circle CY2 and the real axis are compared.

If it is determined in Step S1034 that the coordinates $\alpha 1$, $\alpha 2$ substantially match each other, an advance is made to Step S1035 and it is determined that all the impedance values $Z(\omega_1)$, $Z(\omega_2)$ and $Z(\omega_3)$ belong to the arc region $L_c$. In the present embodiment, that the coordinates $\alpha 1$, $\alpha 2$ substantially match each other means that a difference $|\alpha 1 - \alpha 2|$ is a predetermined value or smaller (e.g. several % or less of the value of $\alpha 1$ or $\alpha 2$) that can be regarded to be substantially 0 with errors of a measurement system and the like considered.

Figure 9:
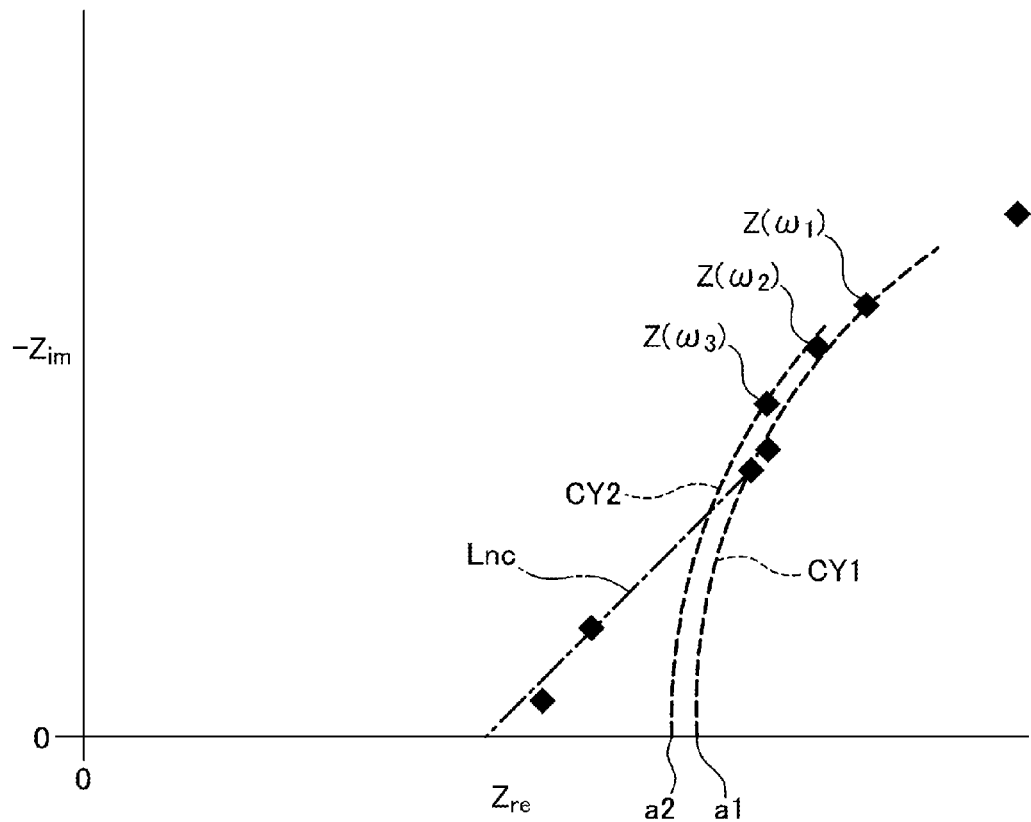
FIG. 9 is a graph showing a mode of determining that impedance values belong to the arc region in the one embodiment.

FIG. 9 shows a mode in which the coordinates $\alpha 1$, $\alpha 2$ match each other.

As is clear from FIG. 9, if the coordinates $\alpha 1$, $\alpha 2$ match each other, it means that the circles CY1, CY2 match each other. Thus, all the impedance values $Z(\omega_1)$, $Z(\omega_2)$ and $Z(\omega_3)$ belong to the arc region $L_c$ on the low frequency side.

On the other hand, if it is determined in Step S1034 that the coordinates $\alpha 1$, $\alpha 2$ do not substantially match each other, an advance is made to Step S1036 and it is determined that at least $Z(\omega_3)$ obtained on the basis of the highest frequency $\omega_3$ belongs to the non-arc region $L_{nc}$.

Figure 10:
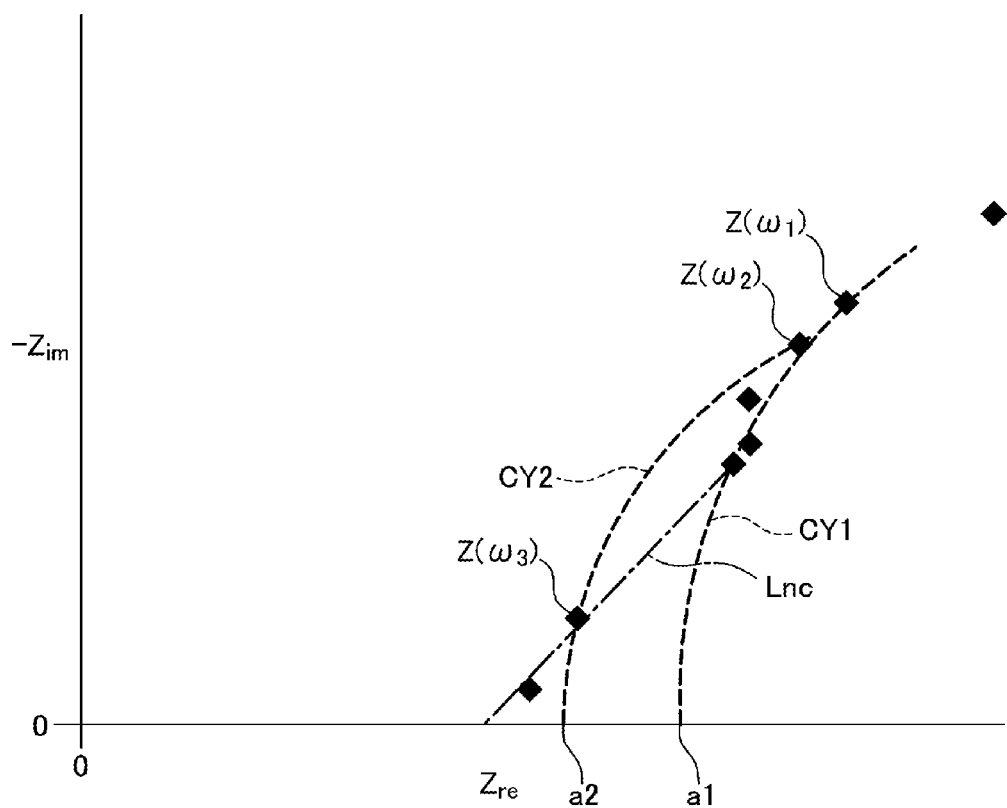
FIG. 10 is a graph showing a mode of determining that at least one impedance value belongs to the non-arc region in the one embodiment.

FIG. 10 shows a mode in which the coordinates α1, α2 do not match each other. As is clear from FIG. 10, in this case, at least $Z(\omega_3)$ belongs to the non-arc region $L_{nc}$ on the high frequency side. On the other hand, $Z(\omega_2)$ is on the arc region $L_c$ in FIG. 10. However, a case where the $Z(\omega_2)$ is present on the non-arc region $L_{nc}$ is also possible if, for example, the coordinate α2 becomes smaller.

Then, as described above, the usability of the impedance values $Z(\omega_1)$, $Z(\omega_2)$ and $Z(\omega_3)$ is determined according to whether or not all the obtained impedance values $Z(\omega_1)$, $Z(\omega_2)$ and $Z(\omega_3)$ belong to the arc region $L_c$ (Step S1035) or whether or not at least the impedance value $Z(\omega_3)$ belongs to the non-arc region $L_{nc}$ (Step S1036).

Here, whether or not the estimation object state quantity calculated on the basis of the impedance values $Z(\omega_1)$, $Z(\omega_2)$ and $Z(\omega_3)$ is usable depending on how each of the obtained impedance values belongs to the arc region $L_c$ or the non-arc region $L_{nc}$ changes according to the type of the estimation object state quantity and the operating state of the fuel cell 1.

For example, if the reaction resistance value and the electrical double layer capacitance of the anode electrode 112 are set as the state quantities to be estimated for the determination of the hydrogen amount, the impedance value belonging to the arc region $L_c$ is usable and the impedance value belonging to the non-arc region $L_{nc}$ is unusable.

Accordingly, if all the impedance values $Z(\omega_1)$, $Z(\omega_2)$ and $Z(\omega_3)$ belong to the arc region $L_c$ as in Step S1035 described above, all of these impedance values $Z(\omega_1)$, $Z(\omega_2)$ and $Z(\omega_3)$ are judged to be usable. On the other hand, if at least the impedance value $Z(\omega_3)$ belongs to the non-arc region $L_{nc}$ as in Step S1036 described above, the impedance value $Z(\omega_3)$ is judged to be unusable.

Referring back to FIG. 4, if at least any one of the impedance values $Z(\omega_1)$, $Z(\omega_2)$ and $Z(\omega_3)$ is determined to be usable in Step S104, the estimation object state quantity is calculated on the basis of the obtained impedance value in Step S106.

Then, in Step S107, the internal state of the fuel cell 1 is detected on the basis of the calculated estimation object state quantity. On the other hand, if all the impedance values $Z(\omega_1)$, $Z(\omega_2)$ and $Z(\omega_3)$ are determined to be unusable in Step S104, an advance is made to Step S105 and an unusable-scene process is performed.

In this unusable-scene process in Step S105, since the impedance values $Z(\omega_1)$, $Z(\omega_2)$ and $Z(\omega_3)$ are determined to be unusable for the detection of the internal state of the fuel cell 1, a process such as the issuance of a command to discard these impedance values and re-obtain new ones or a command to give up the detection is performed.

According to the state detection system for the fuel cell 1 relating to the present embodiment described above, the following effects can be obtained.

In the state detection system relating to the present embodiment, the controller 6 functions as an an estimation object state quantity setting unit configured to set the estimation object state quantity as the index of the internal state (Step S101), an an impedance value acquisition unit configured to obtain the impedance values $Z(\omega_1)$, $Z(\omega_2)$ and $Z(\omega_3)$ of the fuel cell 1 (Step S102) and an an impedance usability judging unit configured to judge whether or not the obtained impedance values $Z(\omega_1)$, $Z(\omega_2)$ and $Z(\omega_3)$ are usable for the calculation of the estimation object state quantity (Step S103). Further, the controller 6 functions as an estimation object state quantity calculation unit configured to calculate the estimation object state quantity set by the estimation object state quantity setting unit on the basis of the obtained impedance values $Z(\omega_1)$, $Z(\omega_2)$ and $Z(\omega_3)$ when the impedance values $Z(\omega_1)$, $Z(\omega_2)$ and $Z(\omega_3)$ are judged to be usable for the calculation of the estimation object state quantity by the impedance usability judging unit (Step S106) and an unusable-scene process execution unit configured to perform the unusable-scene process when the impedance values $Z(\omega_1)$, $Z(\omega_2)$ and $Z(\omega_3)$ are judged to be unusable for the calculation of the estimation object state quantity by the impedance usability judging unit.

According to this, it is possible to set a proper estimation object state quantity as an index of a desired internal state due to factors such as an operating environment of the fuel cell 1 and confirm and judge whether or not the obtained impedance values $Z(\omega_1)$, $Z(\omega_2)$ and $Z(\omega_3)$ are usable for the calculation of this estimation object state quantity. Thus, whether or not accuracy is held for the calculation of the estimation object state quantity based on the impedance values $Z(\omega_1)$, $Z(\omega_2)$ and $Z(\omega_3)$ can be reliably grasped, with the result that accuracy in detecting the internal state of the fuel cell 1 is improved.

Particularly, in the present embodiment, the controller 6 functions as the an impedance value acquisition unit configured to obtain the impedance values $Z(\omega_1)$, $Z(\omega_2)$ and $Z(\omega_3)$ based on three frequencies $\omega_1$, $\omega_2$ and $\omega_3$, and the impedance usability judging unit for determining whether at least one of the impedance values $Z(\omega_1)$, $Z(\omega_2)$ and $Z(\omega_3)$ belongs to the arc region $L_c$ or to the non-arc region $L_{nc}$ in the impedance curve on the complex plane and judging according to the determination result whether or not the impedance value is usable.

For example, when all the impedance values $Z(\omega_1)$, $Z(\omega_2)$ and $Z(\omega_3)$ are determined to be present on the arc region $L_c$, the electrical double layer capacitance $C_{dl}$, the reaction resistance value of the anode electrode 112 and the reaction resistance value of the cathode 113 obtained from at least two of these impedance values $Z(\omega_1)$, $Z(\omega_2)$ and $Z(\omega_3)$ have high accuracy.

Accordingly, the impedance values $Z(\omega_1)$, $Z(\omega_2)$ and $Z(\omega_3)$ are judged to be usable, for example, when the hydrogen amount or oxygen amount of the fuel cell 1 are the internal states to be detected and the electrical double layer capacitance $C_{dl}$, the reaction resistance value $R_a$ of the anode electrode 112 and the reaction resistance value $R_c$ of the cathode 113 are set as the estimation object state quantities.

On the other hand, when at least $Z(\omega_3)$ is determined to belong to the non-arc region $L_{nc}$, an electrolyte membrane resistance $R_{mem}$ and an ionomer resistance $R_{ion}$ obtained from the impedance values $Z(\omega_1)$, $Z(\omega_2)$ and $Z(\omega_3)$ have a certain accuracy or higher if, for example, the impedance value $Z(\omega_3)$ is used instead of an HFR impedance value. Thus, these are judged to be usable.

According to this, whether or not the estimation object state quantity corresponding to the desired internal state of the fuel cell 1 is usable can be judged by a simple method of determining whether each of the impedance values $Z(\omega_1)$, $Z(\omega_2)$ and $Z(\omega_3)$ belongs to the arc region $L_c$ or to the non-arc region $L_{nc}$ of the impedance curve.

Further, in the present embodiment, the controller 6 functions as the impedance usability judging unit for determining whether at least one of the impedance values obtained at three or more frequencies belongs to the arc region $L_c$ or to the non-arc region $L_{nc}$ in the impedance curve by comparing the values of the intersections of the circles CY1, CY2 obtained from two or more impedance values selected from the impedance values $Z(\omega_1)$, $Z(\omega_2)$ and $Z(\omega_3)$ obtained at three frequencies $\omega_1$, $\omega_2$ and $\omega_3$ and the real axis with each other (Steps S1031 to S1036).

Specifically, the controller 6 can determine whether or not all the impedance values $Z(\omega_1)$, $Z(\omega_2)$ and $Z(\omega_3)$ obtained at the three frequencies $\omega_1$, $\omega_2$ and $\omega_3$ belong to the arc region $L_c$ or whether or not the impedance value $Z(\omega_3)$ as one of those belongs to the non-arc region $L_{nc}$ by comparing the value $\alpha 1$ of the intersection of the line CY1 obtained from the impedance values $Z(\omega_1)$ and $Z(\omega_2)$ selected from the impedance values $Z(\omega_1)$, $Z(\omega_2)$ and $Z(\omega_3)$ obtained at the three frequencies $\omega_1$, $\omega_2$ and $\omega_3$ and the real axis and the value $\alpha 2$ of the intersection of the line CY2 obtained from the impedance values $Z(\omega_2)$ and $Z(\omega_3)$ and the real axis with each other.

In this way, whether at least one of the obtained impedance values $Z(\omega_1)$, $Z(\omega_2)$ and $Z(\omega_3)$ belongs to the arc region $L_c$ or to the non-arc region $L_{nc}$ can be determined by a simple method of comparing the value $\alpha 1$ of the intersection of the line CY1 obtained from the impedance values $Z(\omega_1)$ and $Z(\omega_2)$ and the real axis and the value $\alpha 2$ of the intersection of the line CY2 obtained from the impedance values $Z(\omega_2)$ and $Z(\omega_3)$ and the real axis with each other.

Particularly, in the present embodiment, the line CY1 can be determined on the basis of the obtained impedance values $Z(\omega_1)$ and $Z(\omega_2)$ and the line CY2 can be determined on the basis of the obtained impedance values $Z(\omega_2)$ and $Z(\omega_3)$ from Equation (2) based on the simplified equivalent circuit shown in FIG. 8. Thus, the calculation is easy and a computation load on the controller 6 can be reduced.

(Second Embodiment)

A second embodiment is described below. It should be noted that the same elements as in the first embodiment are denoted by the same reference signs and not described. In the present embodiment, whether impedance values $Z(\omega_1)$, $Z(\omega_2)$ and $Z(\omega_3)$ belong to an arc region $L_c$ or to a non-arc region $L_{nc}$ is particularly determined on the basis of an electrical double layer capacitance value $C_{dl}$ obtained from a frequency characteristic of an imaginary component impedance value on a plane with $-1/(\omega Z_{im})$ taken on a vertical axis and $1/\omega^2$ taken on a horizontal axis.

Figure 11:
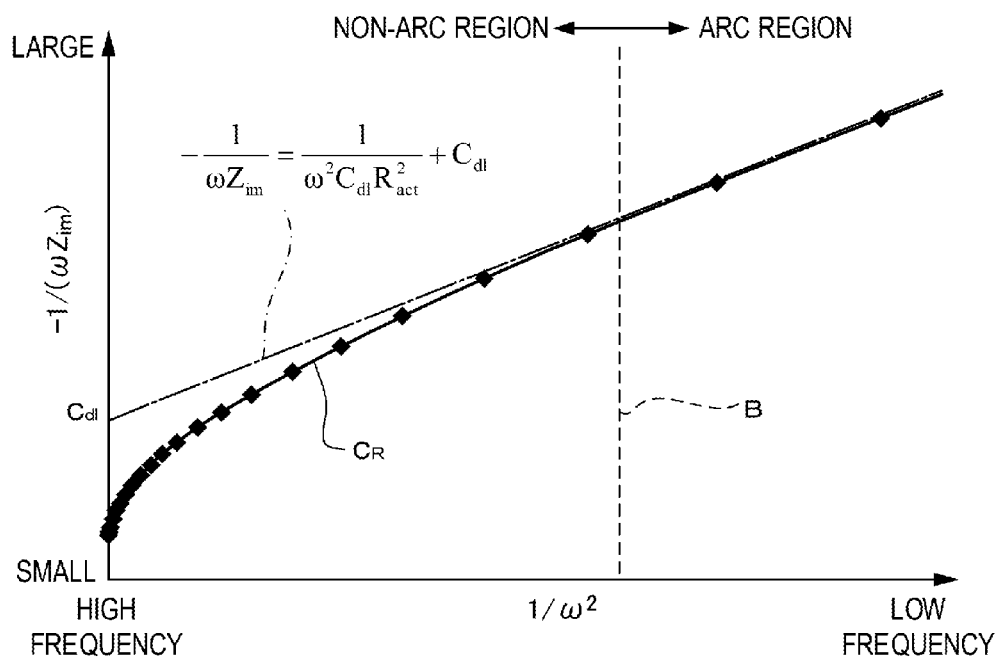
FIG. 11 is a graph showing a frequency characteristic of an imaginary component impedance value.

FIG. 11 is a graph showing a frequency characteristic of an imaginary component impedance value in the present embodiment. Here, a straight line shown by a dashed-dotted line in FIG. 11 is a graphical representation of Equation (3) based on the simplified equivalent circuit described above.

On the other hand, a curve $C_R$ shown in FIG. 11 is a curve drawn by plotting imaginary component impedance measurement values $Z_{im}(\omega)$ measured at a plurality of frequencies $\omega$ in advance in a fuel cell 1.

As shown in FIG. 11, the curve $C_R$ based on actual measurement matches the straight line based on the simplified equivalent circuit described above in a relatively low frequency region (arc region $L_c$), but does not match in a high frequency region (non-arc region $L_{nc}$) and the value rapidly decreases to widen a gap.

This means, in fact, that the simplified equivalent circuit shown in FIG. 8 satisfactorily models the actual fuel cell in the arc region $L_c$, but does not satisfactorily model it in the non-arc region $L_{nc}$.

Accordingly, in the present embodiment, whether three impedance values $Z(\omega_1)$, $Z(\omega_2)$ and $Z(\omega_3)$ belong to the arc region $L_c$ or to the non-arc region $L_{nc}$ is determined utilizing this fact.

Figure 12:
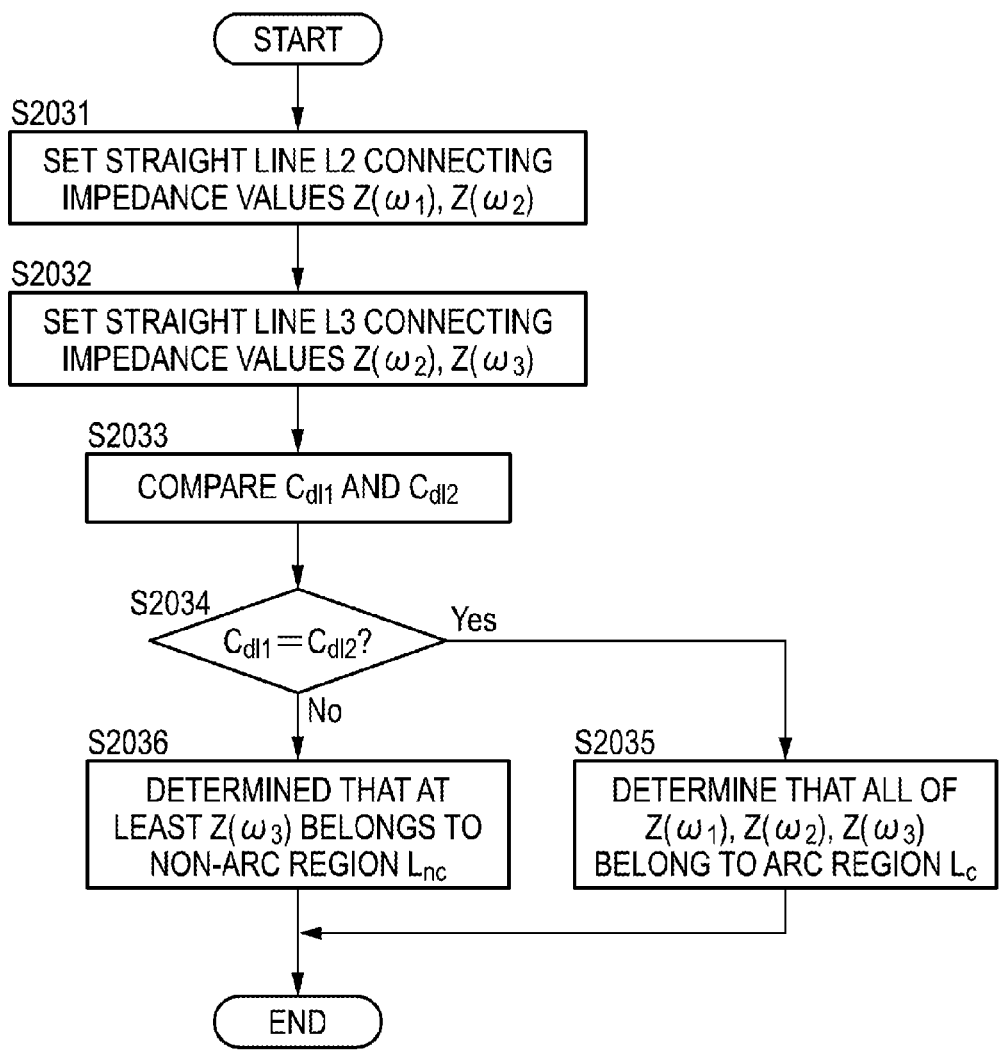
FIG. 12 is a flow chart showing the flow of determining whether impedance values belong to an arc region or to a non-arc region of an impedance curve in one embodiment.

FIG. 12 is a flow chart showing the flow of determining whether three impedance values $Z(\omega_1)$, $Z(\omega_2)$ and $Z(\omega_3)$ belong to the arc region $L_c$ or to the non-arc region $L_{nc}$ in the present embodiment.

In Step S2031, a straight line L2 connecting an imaginary component $Z_{im1}(\omega_1)$ of the impedance value $Z(\omega_1)$ and an imaginary component $Z_{im2}(\omega_2)$ of the impedance value $Z(\omega_2)$ is set on a plane with $-1/(\omega Z_{im})$ taken on a vertical axis and $1/\omega^2$ taken on a horizontal axis.

In Step S2032, a straight line L3 connecting the impedance values $Z(\omega_1)$ and $Z(\omega_3)$ is set on the plane with $-1/(\omega Z_{im})$ taken on the vertical axis and $1/\omega^2$ taken on the horizontal axis by a method similar to the case of the above straight line L2.

In Step S2033, the magnitude of an electrical double layer capacitance value $C_{dl1}$, which is an intersection of the straight line L2 and the vertical axis, and that of an electrical double layer capacitance value $C_{dl2}$, which is an intersection of the straight line L3 and the vertical axis, are compared.

If the electrical double layer capacitance values $C_{dl1}$, $C_{dl2}$ are determined to substantially match each other in Step S2034, an advance is made to Step S2035 and it is determined that all the impedance values $Z(\omega_1)$, $Z(\omega_2)$ and $Z(\omega_3)$ belong to the arc region $L_c$. In the present embodiment, that the electrical double layer capacitance values $C_{dl1}$, $C_{dl2}$ substantially match each other means that a difference $|C_{dl1}-C_{dl2}|$ is a predetermined value or smaller (e.g. several % or less of the value of $C_{dl1}$ or $C_{dl2}$) that can be regarded to be substantially 0 with errors of a measurement system and the like considered.

Figure 13:
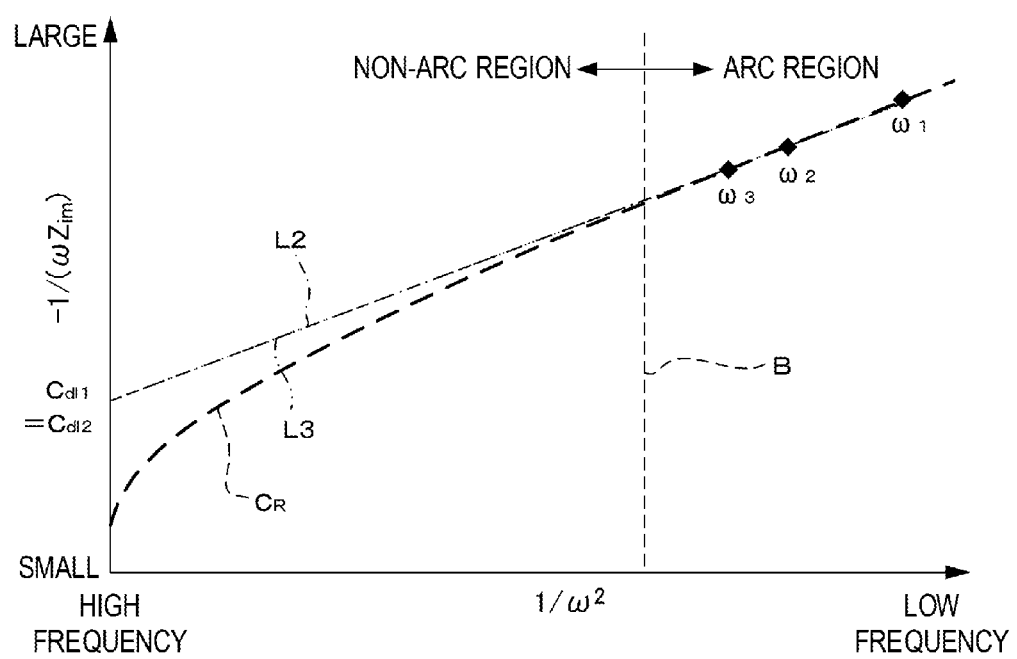
FIG. 13 is a graph showing a mode of determining that the impedance values belong to the arc region in the one embodiment.

FIG. 13 shows an impedance imaginary component frequency characteristic curve representing a mode in which the electrical double layer capacitance values $C_{dl1}$, $C_{dl2}$ match each other.

Here, as is also understood from FIG. 13, both straight lines L2 and L3 pass through a point corresponding to the frequency $\omega_2$ on a plane shown in FIG. 13. Thus, when the electrical double layer capacitance value $C_{dl1}$, which is an intercept of the straight line L2, and the electrical double layer capacitance value $C_{dl2}$, which is an intercept of the straight line L3, match each other, the gradients of those straight lines have to match and the straight lines L2 and L3 match each other. Thus, all the impedance values $Z(\omega_1)$, $Z(\omega_2)$ and $Z(\omega_3)$ belong to the arc region $L_c$.

On the other hand, if it is determined in Step S2034 that the electrical double layer capacitance values $C_{dl1}$, $C_{dl2}$ do not substantially match each other, an advance is made to Step S2036 and it is determined that at least $Z(\omega_3)$ obtained on the basis of the highest frequency $\omega_3$ belongs to the non-arc region $L_{nc}$.

Figure 14:
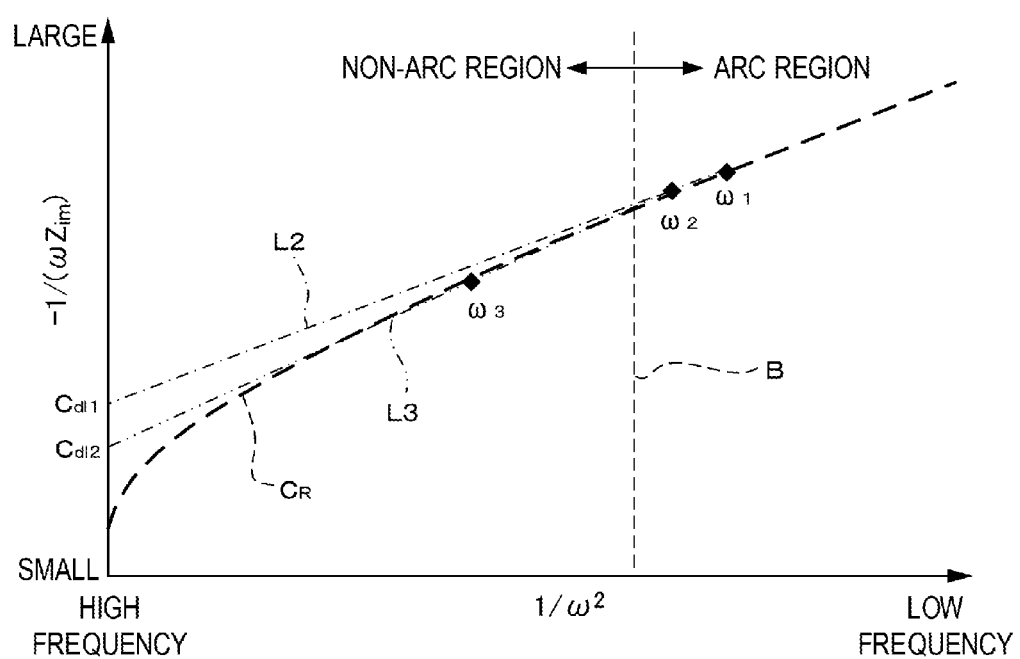
FIG. 14 is a graph showing a mode of determining that at least one impedance value belongs to the non-arc region in the one embodiment.

FIG. 14 shows a mode in which the electrical double layer capacitance values $C_{dl1}$, $C_{dl2}$ do not match each other. With reference to FIG. 14, it is reasonable to deter mine that the frequency $\omega_3$ is on the low frequency side and at least $Z(\omega_3)$ belongs to the non-arc region $L_{nc}$. On the other hand, although the impedance value $Z(\omega_2)$ belongs to the arc region $L_c$ in FIG. 14, it is also supposed to be reasonable to determine that the impedance value $Z(\omega_2)$ is present on the non-arc region $L_{nc}$ if, for example, the electrical double layer capacitance value $C_{dl2}$ is obtained as a smaller value.

Then, after it is determined whether all the impedance values $Z(\omega_1)$, $Z(\omega_2)$ and $Z(\omega_3)$ are present on the arc region $L_c$ or on the non-arc region $L_{nc}$ as described above, whether or not the impedance values $Z(\omega_1)$, $Z(\omega_2)$ and $Z(\omega_3)$ are usable is judged in Step S104 according to the determination result and the process of Steps S105 to S107 in FIG. 4 described above is performed as in the first embodiment.

According to the state detection system for the fuel cell 1 relating to the present embodiment described above, the following effects can be obtained.

In the state detection system for the fuel cell 1 relating to the present embodiment, the controller 6 functions to determine whether at least one of the impedance values $Z(\omega_1)$, $Z(\omega_2)$ and $Z(\omega_3)$ obtained at three frequencies $\omega_1$, $\omega_2$ and $\omega_3$ belongs to the arc region $L_c$ or to the non-arc region $L_{nc}$ in the impedance curve by comparing two or more electrical double layer capacitance values $C_{dl1}$, $C_{dl2}$ obtained from two or more impedance values selected from the impedance values $Z(\omega_1)$, $Z(\omega_2)$ and $Z(\omega_3)$ obtained at three frequencies $\omega_1$, $\omega_2$ and $\omega_3$ with each other (Steps S2031 to S2036).

Specifically, the electrical double layer capacitance value $C_{dl1}$ obtained by selecting the impedance values $Z(\omega_1)$ and $Z(\omega_2)$ and the electrical double layer capacitance value $C_{dl2}$ obtained by selecting the impedance values $Z(\omega_2)$ and $Z(\omega_3)$ can be compared with each other to determine whether or not all three impedance values $Z(\omega_1)$, $Z(\omega_2)$ and $Z(\omega_3)$ belong to the arc region $L_c$ or whether or not one impedance value $Z(\omega_3)$ out of those belongs to the non-arc region $L_{nc}$.

In this way, the electrical double layer capacitance value $C_{dl1}$, which is one type of the estimation object state quantity used for the state detection of the fuel cell 1, can be used to determine whether the three impedance values $Z(\omega_1)$, $Z(\omega_2)$ and $Z(\omega_3)$ belong to the arc region $L_c$ or to the non-arc region $L_{nc}$, which eventually contributes to the usability judgment of these impedance values $Z(\omega_1)$, $Z(\omega_2)$ and $Z(\omega_3)$.

Accordingly, for example, when at least one of the impedance values $Z(\omega_1)$, $Z(\omega_2)$ and $Z(\omega_3)$ is judged to be usable and the internal state for which the electrical double layer capacitance value $C_{dl}$ such as the hydrogen amount should be set as a state quantity to be estimated is detected, processes for the above impedance usability judgment step and estimation object state quantity computation step can be reduced and a computation load on the controller 6 can also be reduced.

(Third Embodiment)

A third embodiment is described below. It should be noted that the same elements as in the first or second embodiment are denoted by the same reference signs and not described. In the present embodiment, whether impedance values $Z(\omega_1)$, $Z(\omega_2)$ and $Z(\omega_3)$ belong to an arc region $L_c$ or to a non-arc region $L_{nc}$ is particularly determined on the basis of a reaction resistance value $R_{act}$ obtained from a frequency characteristic of an imaginary component impedance value on a plane with $-1/(\omega Z_{im})$ taken on a vertical axis and $1/\omega^2$ taken on a horizontal axis.

Figure 15:
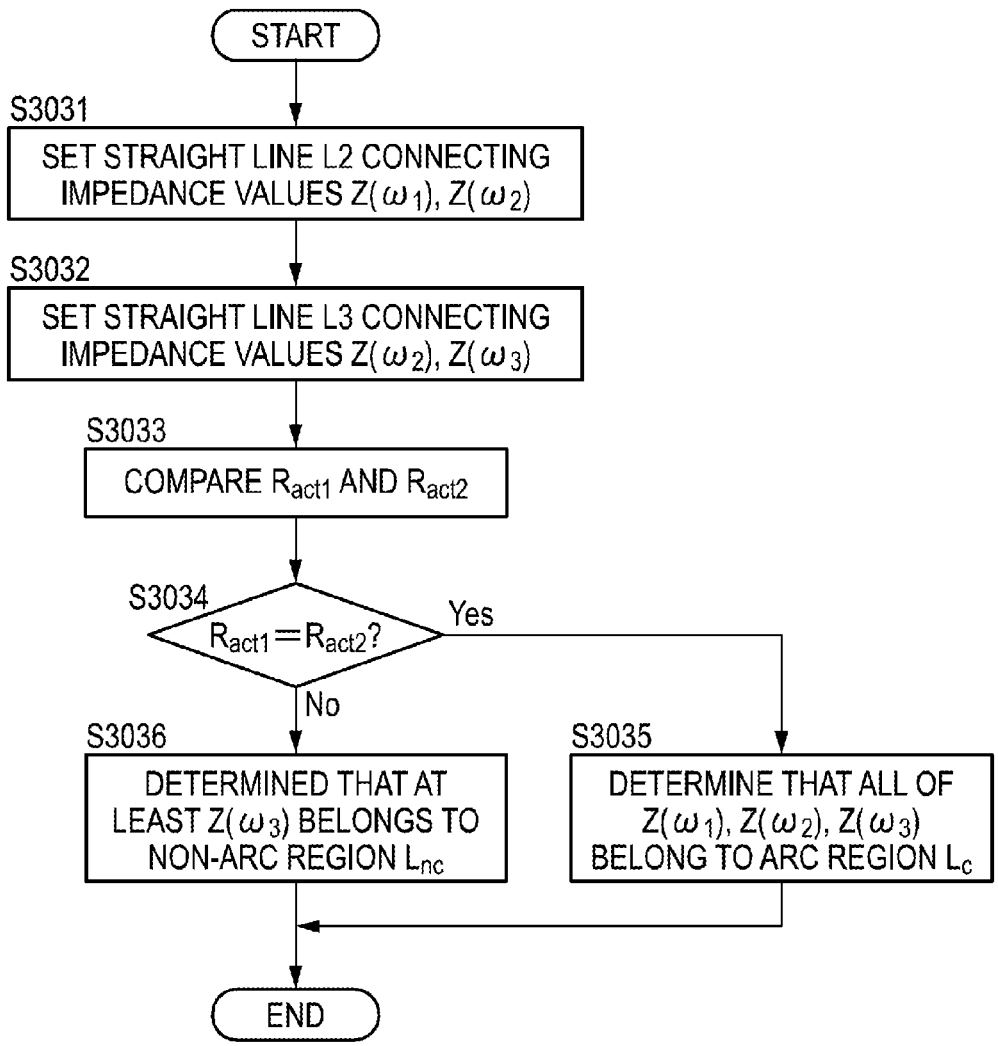
FIG. 15 is a flow chart showing the flow of determining whether impedance values belong to an arc region or to a non-arc region of an impedance curve in the one embodiment.

FIG. 15 is a flow chart showing the flow of determining whether the impedance values $Z(\omega_1)$, $Z(\omega_2)$ and $Z(\omega_3)$ belong to the arc region $L_c$ or to the non-arc region $L_{nc}$ in the present embodiment.

In Step S3031, a straight line L2 connecting an imaginary component $Z_{im1}(\omega_1)$ of the impedance value $Z(\omega_1)$ and an imaginary component $Z_{im2}(\omega_2)$ of the impedance value $Z(\omega_2)$ is set on a plane with $-1/(\omega Z_{im})$ taken on a vertical axis and $1/\omega^2$ taken on a horizontal axis as in Step S2031 of FIG. 12 described above.

Also in Step S3032, a straight line L3 connecting the impedance values $Z(\omega_2)$ and $Z(\omega_3)$ is set on the plane with $-1/(\omega Z_{im})$ taken on the vertical axis and $1/\omega^2$ taken on the horizontal axis by the same method as in the case of the above straight line L2 by a method similar to the case of the above straight line L2.

In Step S3033, the magnitude of a reaction resistance value $R_{act1}$ based on the straight line L2 and that of a reaction resistance value $R_{act2}$ based on the straight line L3 are compared.

Here, the reaction resistance value $R_{act1}$ is obtained, for example, by substituting the frequencies $\omega_1$, $\omega_2$ and the imaginary components $Z_{im1}(\omega_1)$ and $Z_{im2}(\omega_2)$ of the obtained impedance values into the above Equation (3) to obtain an equation with $C_{dl1}$ and $R_{act1}$ as unknowns and solving this equation.

Particularly, a straight line of the equation expressed by the above Equation (3) is supposed to match the straight line L2. Thus, by comparing the values of a gradient and an intercept of the straight line L2 obtained in Step S3031 described above and those of a gradient $1/(C_{dl1} \cdot R_{act}^2)$ and an intercept Can of a straight line obtained from the equation of this Equation (3), the reaction resistance value $R_{act1}$ can be easily calculated. Further, the reaction resistance value $R_{act2}$ can also be calculated by a similar method.

It should be noted that an equation obtained from the following equation based on real components $R_{re}$ of the impedance values may be used instead of Equation (3) based on the imaginary components $Z_{im}$ of the impedance values in obtaining the reaction resistance values $R_{act1}$ and $R_{act2}$.

[Equation 4]

$$\frac{1}{Z_{re} - R_{mem}} = \omega^2 C_{dl}^2 R_{act} + \frac{1}{R_{act}} \quad (4)$$

However, in this case, since an electrolyte membrane resistance value $R_{mem}$ is added as an unknown as compared to the equation based on the above Equation (3), this electrolyte membrane resistance value $R_{mem}$ needs to be separately determined such as by HFR.

Subsequently, if the reaction resistance values $R_{act1}$ and $R_{act2}$ are deter ruined to substantially match each other in Step S3034, an advance is made to Step S3035 and it is determined that all the impedance values $Z(\omega_1)$, $Z(\omega_2)$ and $Z(\omega_3)$ belong to the arc region $L_c$. In the present embodiment, that the reaction resistance values $R_{act1}$ and $R_{act2}$ substantially match each other means that a difference $|R_{act1}-R_{act2}|$ is a predetermined value or smaller (e.g. several % or less of the value of $R_{act1}$ or $R_{act2}$) that can be regarded to be substantially 0 with errors of a measurement system and the like considered.

Figure 16:
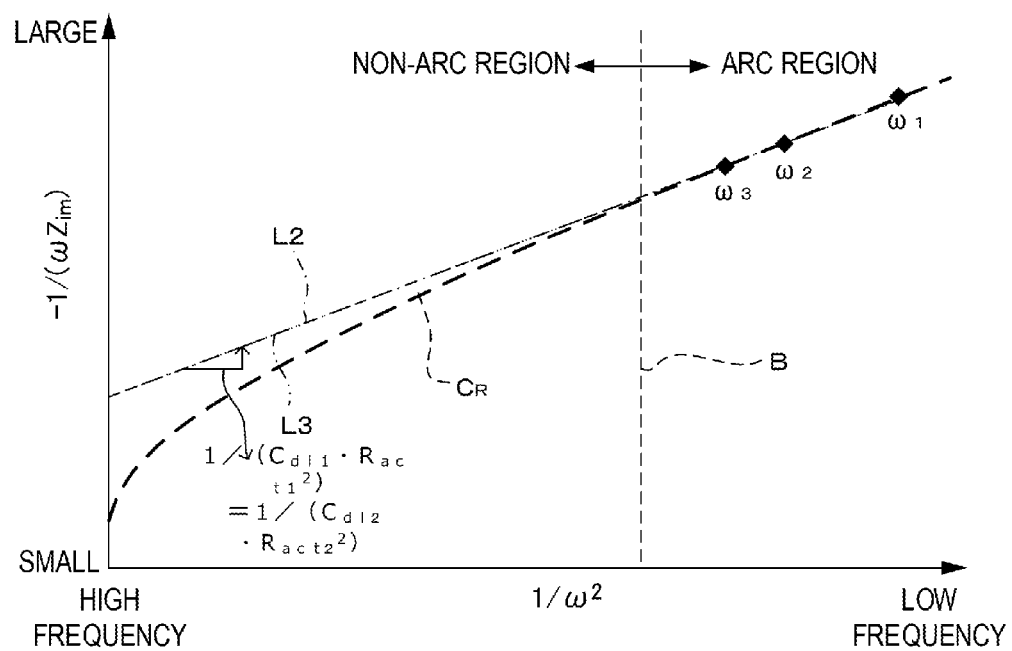
FIG. 16 is a graph showing a mode of determining that the impedance values belong to the arc region in the one embodiment.

FIG. 16 shows an impedance imaginary component frequency characteristic curve representing a mode in which the reaction resistance values $R_{act1}$, $R_{act2}$ match each other.

Here, both straight lines L2 and L3 pass through a point corresponding to the frequency $\omega_2$ on a plane shown in FIG. 16. Thus, the known frequencies $\omega_2$ and impedance value imaginary component $Z_{im}(\omega_2)$ can be commonly substituted into Equation (3) both when the reaction resistance value $R_{act1}$ and the electrical double layer capacitance $C_{dl1}$ are applied to Equation (3) and when the reaction resistance value $R_{act2}$ and the electrical double layer capacitance $C_{dl2}$ are applied to Equation (3). If a condition that the reaction resistance values $R_{act1}$ and $R_{act2}$ match each other ($R_{act1}=R_{act2}$) is imposed, assuming this, the gradients and intercepts of the straight lines L2 and L3 match each other and both straight lines perfectly match.

Thus, in this case, it is reasonable to determine that all the impedance values $Z(\omega_1)$, $Z(\omega_2)$ and $Z(\omega_3)$ belong to the arc region $L_c$ as is also clear from FIG. 16.

On the other hand, if it is determined in Step S3034 that the reaction resistance values $R_{act\,1}$, $R_{act2}$ do not substantially match each other, an advance is made to Step S3036 and it is determined that at least $Z(\omega_3)$ obtained at the highest frequency $\omega_3$ belongs to the non-arc region $L_{nc}$.

Figure 17:
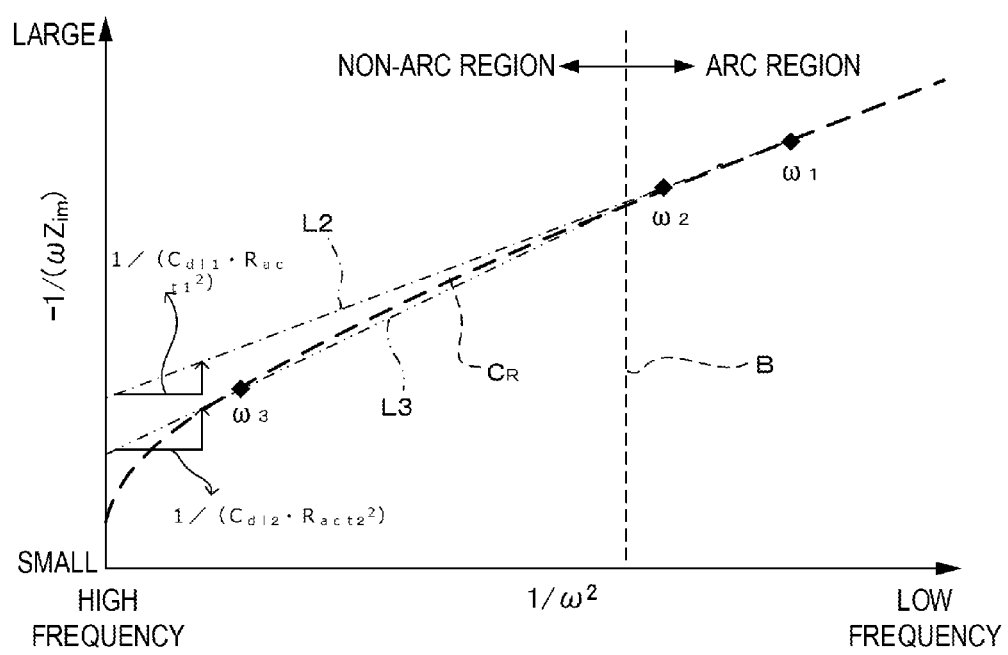
FIG. 17 is a graph showing a mode of determining that at least one impedance value belongs to the non-arc region in the one embodiment.

FIG. 17 shows a mode in which the reaction resistance values $R_{act1}$, $R_{act2}$ do not match each other. In this case, with reference to FIG. 17, it is reasonable to determine that the frequency $\omega_3$ is on the low frequency side and at least $Z(\omega_3)$ belongs to the non-arc region $L_c$. On the other hand, the impedance value $Z(\omega_2)$ belongs to the arc region $L_c$ in FIG. 17. However, the gradient $1/(C_{dl2} \cdot R_{act2})$ of the straight line L3 becomes larger if, for example, the reaction resistance value $R_{act2}$ is obtained as a smaller value. Thus, it is also supposed to be reasonable to determine that the impedance value $Z(\omega_2)$ is present on the non-arc region $L_{nc}$.

As described above, after it is determined whether the impedance values $Z(\omega_1)$, $Z(\omega_2)$ and $Z(\omega_3)$ are present on the arc region or on the non-arc region the process of Steps S105 to S107 in FIG. 4 described above is performed.

According to the state detection system for the fuel cell 1 relating to the present embodiment described above, the following effects can be obtained.

In the state detection system for the fuel cell 1 relating to the present embodiment, the controller 6 functions as an impedance usability judging unit for determining whether at least one of two or more impedance values belongs to the arc region $L_c$ or to the non-arc region $L_{nc}$ in the impedance curve by comparing two or more reaction resistance values $R_{act1}$, $R_{act2}$ obtained from the two or more impedance values selected from the impedance values $Z(\omega_1)$, $Z(\omega_2)$ and $Z(\omega_3)$ obtained at three frequencies $\omega_1$, $\omega_2$ and $\omega_3$ with each other (Steps S3031 to S3036).

Specifically, the reaction resistance value $R_{act1}$ obtained by selecting the impedance values $Z(\omega_1)$ and $Z(\omega_2)$ and the reaction resistance value $R_{act2}$ obtained by selecting the impedance values $Z(\omega_2)$ and $Z(\omega_3)$ can be compared with each other to determine whether or not all the three impedance values $Z(\omega_1)$, $Z(\omega_2)$ and $Z(\omega_3)$ belong to the arc region $L_c$ or whether or not one impedance value $Z(\omega_3)$ out of those belongs to the non-arc region $L_{nc}$.

In this way, the reaction resistance value $R_{act1}$, which is one type of the estimation object state quantity used for the state detection of the fuel cell 1, can be used to determine whether all the three impedance values $Z(\omega_1)$, $Z(\omega_2)$ and $Z(\omega_3)$ belong to the arc region $L_c$ or to the non-arc region $L_{nc}$, which eventually contributes to the usability judgment of these impedance values $Z(\omega_1)$, $Z(\omega_2)$ and $Z(\omega_3)$.

Accordingly, for example, when at least one of the impedance values $Z(\omega_1)$, $Z(\omega_2)$ and $Z(\omega_3)$ is judged to be usable and the internal state for which the reaction resistance values $R_{act1}$, $R_{act2}$ such as the hydrogen amount and the oxygen amount should be set as state quantities to be estimated is detected, processes for the above impedance usability judgment step and estimation object state quantity computation step can be reduced and a computation load on the controller 6 can also be reduced.

(Fourth Embodiment)

A fourth embodiment is described below. It should be noted that the same elements as in the first embodiment are denoted by the same reference signs and not described. In the first embodiment, whether the estimation object state quantity is usable is determined on the basis of whether or not the coordinate $\alpha 1$ of the intersection of the circle CY1 (based on the impedance values $Z(\omega_1)$ and $Z(\omega_2)$) and the real axis and the coordinate $\alpha 2$ of the intersection of the circle CY2 (based on the impedance values $Z(\omega_2)$ and $Z(\omega_3)$) and the real axis on the complex plane match. Instead of this, whether the estimation object state quantity is usable is determined on the basis of a comparison result of an intersection of a straight line based on the impedance values $Z(\omega_1)$ and $Z(\omega_2)$ and the real axis and an intersection of a straight line based on the impedance values $Z(\omega_2)$ and $Z(\omega_3)$ and the real axis in the present embodiment.

Figure 18:
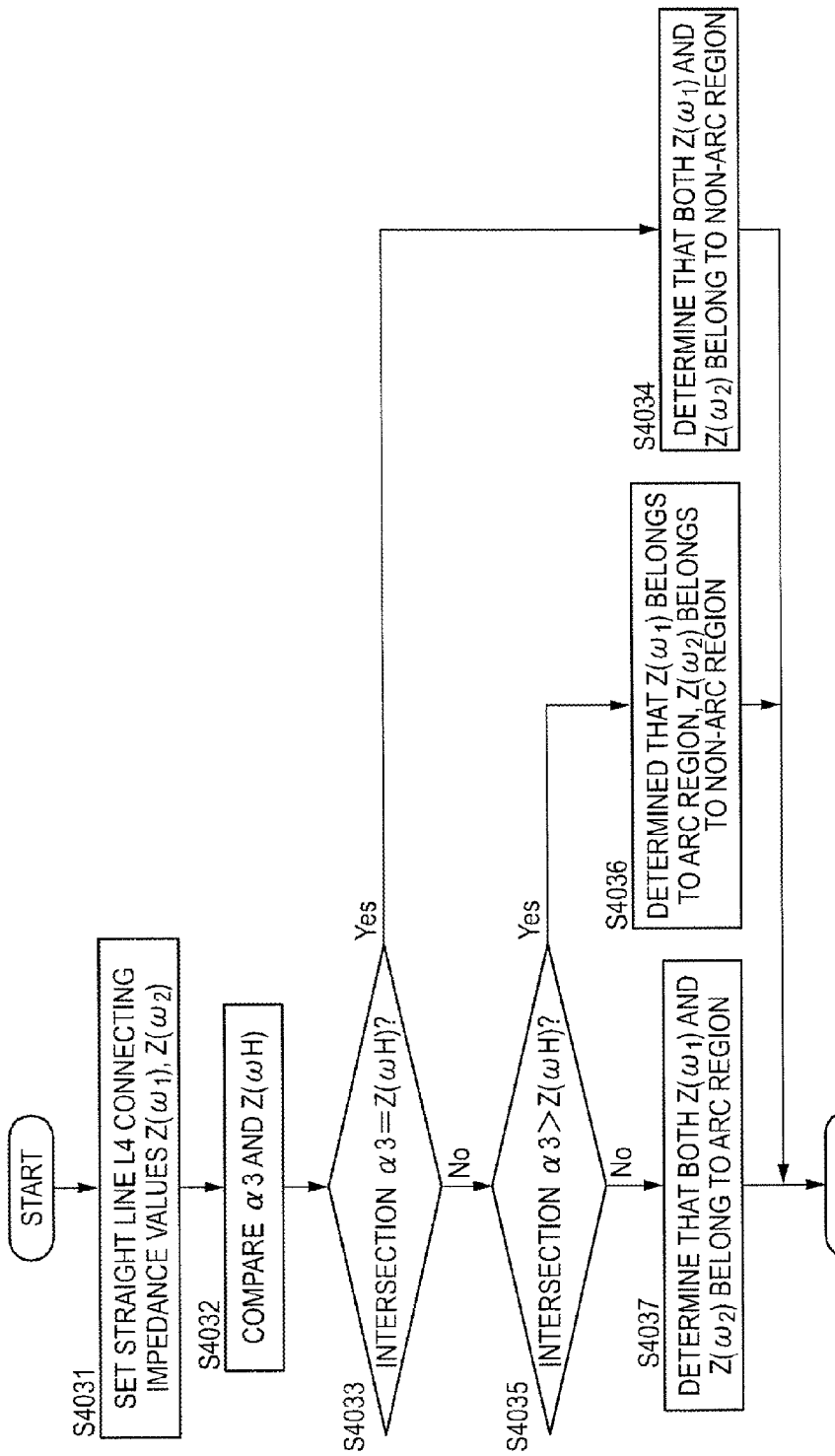
FIG. 18 is a flow chart showing the flow of determining whether impedance values belong to an arc region or to a non-arc region of an impedance curve in the one embodiment.

FIG. 18 is a flow chart showing the flow of determining whether impedance values belong to an arc region or to a non-arc region of an impedance curve.

It should be noted that, in the present embodiment, a frequency $\omega_H$ equivalent to so-called HFR is used as a highest frequency $\omega_3$. Thus, an impedance value $Z(\omega_H)$ at this frequency $\omega_H$ is measured in advance. In the present embodiment, it is determined whether or not the impedance values $Z(\omega_1)$ and $Z(\omega_H)$ belong to the arc region $L_c$ or to the non-arc region $L_{nc}$ in the impedance curve.

First, in Step S4031, a straight line LA connecting the impedance values $Z(\omega_1)$ and $Z(\omega_H)$ is set on the complex plane. It should be noted that if sets $(Z_{re1}(\omega_1), Z_{im1}(\omega_1))$, $(Z_{re2}(\omega_2), Z_{im2}(\omega_2))$ of real components and imaginary components of the impedance values at these two points are obtained, the straight line L4 connecting these is determined.

In Step S4032, a coordinate $\alpha 3$ of an intersection of the straight line L4 and the real axis and the HFR impedance value $Z(\omega_H)$ are compared.

If it is determined in Step S4033 that the value of the coordinate $\alpha 3$ and the HFR impedance value $Z(\omega_H)$ substantially match each other, an advance is made to Step S4034 and it is determined that both impedance values $Z(\omega_1)$ and $Z(\omega_H)$ belong to the non-arc region $L_{nc}$.

In the present embodiment, that the value of the coordinate $\alpha 3$ and the HFR impedance value $Z(\omega_H)$ substantially match each other means that a difference $|\alpha 3 - Z(\omega_H)|$ is a predetermined value or smaller (e.g. several % or less of the value of $\alpha 3$ or $Z(\omega_H)$) that can be regarded to be substantially 0 with errors of a measurement system and the like considered.

Figure 19:
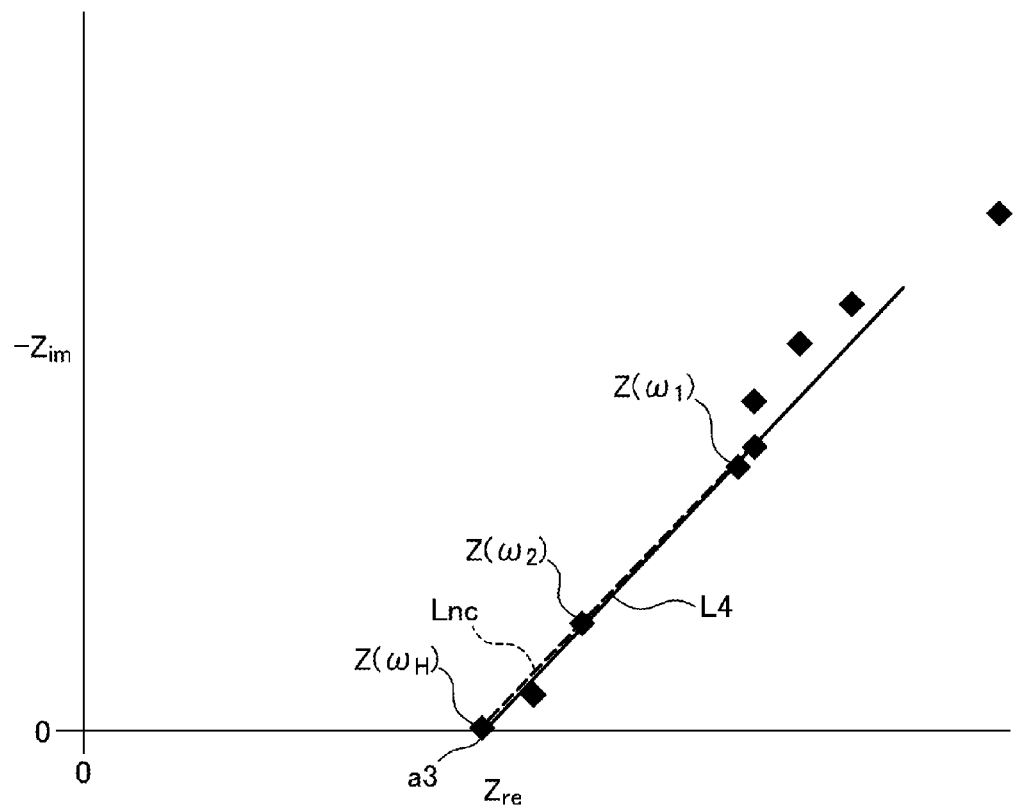
FIG. 19 is a graph showing a mode of determining that the impedance values belong to the non-arc region in the one embodiment.

FIG. 19 shows a mode in which the value of the coordinate $\alpha 3$ and the HFR impedance value $Z(\omega_H)$ substantially match each other. It should be noted that although the non-arc region $L_{nc}$ of the impedance curve is virtually shown by a broken line for the convenience of description in FIG. 19, a mode of the non-arc region $L_{nc}$ is not clearly determined like this during the actual measurement of the impedance value of a fuel cell 1. Further, the non-arc region $L_{nc}$ is also similarly shown by a broken line in FIGS. 20 and 21 to be described later.

As is understood from FIG. 19, when the coordinate $\alpha 3$ of the intersection of the straight line L4 connecting two impedances $Z(\omega_1)$ and $Z(\omega_2)$ based on measurement and the real axis substantially match the HFR impedance value $Z(\omega_H)$, which is an intersection of the non-arc region $L_{nc}$ and the real axis on the complex plane, it is reasonable to determine that this straight line L4 substantially matches the non-arc region $L_{nc}$ of the impedance curve. In this case, if it is assumed that either one of the impedance values $Z(\omega_1)$ and $Z(\omega_2)$ on the straight line L4 belongs to the non-arc region $L_{nc}$, the non-arc region $L_{nc}$ and the straight line L4 do not match. Thus, it is reasonable to determine that both impedance values $Z(\omega_1)$ and $Z(\omega_2)$ belong to the non-arc region $L_{nc}$.

On the other hand, if it is determined in Step S4033 that the value of the coordinate $\alpha 3$ and the HFR impedance value $Z(\omega_H)$ do not substantially match each other, an advance is made to Step S4035 and it is determined whether or not the value of the coordinate $\alpha 3$ is larger than the HFR impedance value $Z(\omega_H)$.

If the coordinate $\alpha 3$ of the intersection is determined to be larger than the HFR impedance value $Z(\omega_H)$, an advance is made to Step S4036 and it is determined that at least the impedance value $Z(\omega_1)$ corresponding to the frequency $\omega_1$ having a relatively small value belongs to the arc region $L_c$.

Figure 20:
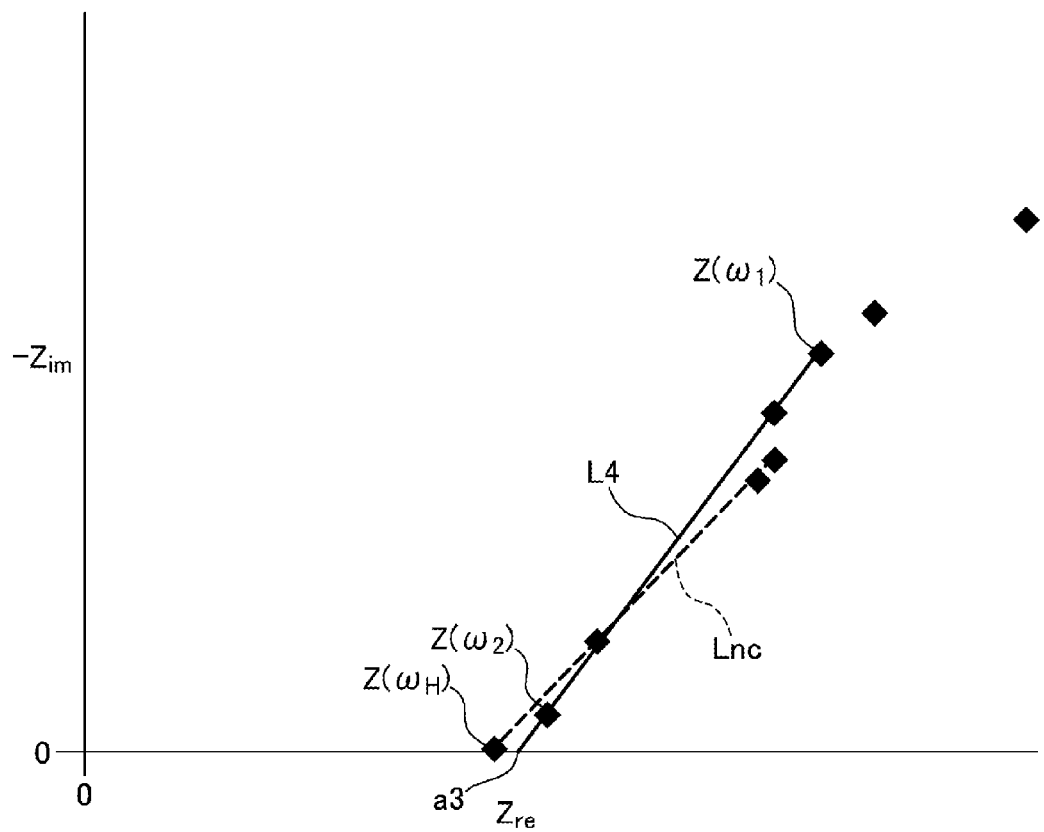
FIG. 20 is a graph showing a mode of determining that one impedance value belongs to the arc region and another impedance value belongs to the non-arc region in the one embodiment.

FIG. 20 shows a mode in which the coordinate α3 of the intersection of the straight line L4 and the real axis is larger than the HFR impedance value $Z(\omega_1)$. In this case, as is clear also from FIG. 20, it is reasonable to determine that the impedance value $Z(\omega_1)$ corresponding to the frequency $\omega_1$ (right side of FIG. 20) having a relatively small value belongs to the arc region $L_c$ and the impedance value $Z(\omega_2)$ corresponding to the relatively large frequency $\omega_2$ (left side of FIG. 20) belongs to the non-arc region $L_{nc}$.

On the other hand, if it is determined in Step S4035 described above that the coordinate α3 of the intersection is smaller than the HFR impedance value $Z(\omega_H)$, an advance is made to Step S4037 and it is determined that both impedance values $Z(\omega_1)$ and $Z(\omega_2)$ belong to the arc region $L_c$.

Figure 21:
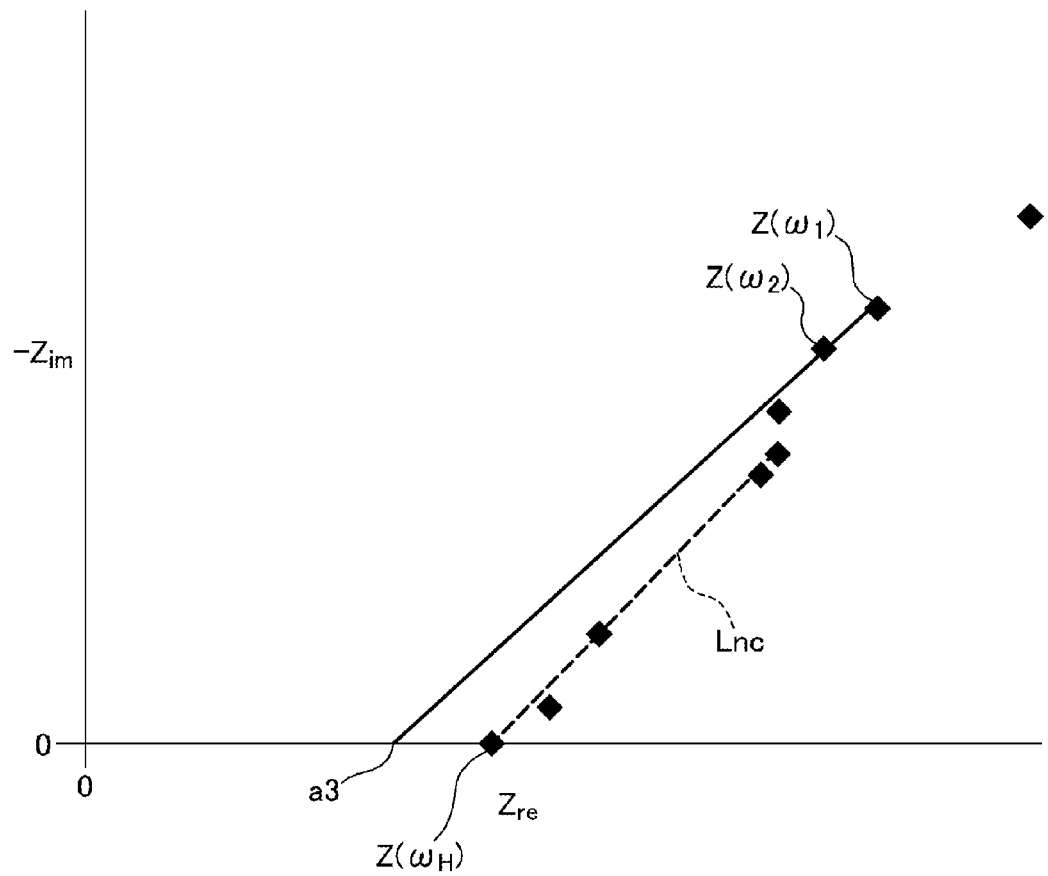
FIG. 21 is a graph showing a mode of determining that the impedance values belong to the arc region in the one embodiment.

FIG. 21 shows a mode in which the coordinate α3 of the intersection of the straight line L4 and the real axis is smaller than the HFR impedance value $Z(\omega_H)$. As is clear also from FIG. 21, it is reasonable to determine that the impedance value $Z(\omega_2)$ corresponding to the relatively large frequency $\omega_2$ (left side of FIG. 21) belongs to the arc region $L_c$ and the impedance value $Z(\omega_1)$ corresponding to the relatively small frequency $\omega_1$ (right side of FIG. 21) also belongs to the arc region $L_c$.

Then, as described above, after it is determined whether each of the impedance values $Z(\omega_1)$ and $Z(\omega_2)$ is present on the arc region $L_c$ or on the non-arc region $L_{nc}$, the process of Steps S105 to S107 in FIG. 4 described above is performed.

According to the state detection system for the fuel cell 1 relating to the present embodiment described above, the following effects can be obtained.

In the state detection system relating to the present embodiment, the controller 6 functions as an impedance usability judging unit for determining whether two impedance values $Z(\omega_1)$ and $Z(\omega_2)$ belong to the arc region $L_c$ or to the non-arc region $L_{nc}$ in the impedance curve by comparing the value α3 of the intersection of the line L4 obtained from two impedance values $Z(\omega_1)$ and $Z(\omega_2)$ selected from the impedance values $Z(\omega_1)$, $Z(\omega_2)$ and $Z(\omega_H)$ obtained at three frequencies $\omega_1$, $\omega_2$ and $\omega_H$ and the real axis and the high frequency impedance value $Z(\omega_H)$ obtained at the frequency $\omega_H$ in a high frequency band with each other.

Thus, according to the present embodiment, whether each of the impedance values $Z(\omega_1)$ and $Z(\omega_2)$ belongs to the arc region $L_c$ or to the non-arc region $L_{nc}$ can be grasped in more detail, which contributes to a further improvement in the accuracy of the estimation object state quantity based on these impedance values $Z(\omega_1)$ and $Z(\omega_1)$.

(Fifth Embodiment)

A fifth embodiment is described below. It should be noted that the same elements as in the first embodiment are denoted by the same reference signs and not described.

In the present embodiment, a frequency ω is re-searched and a usable impedance value $Z(\omega)$ is found and re-obtained in the unusable-scene process in Step S105 of FIG. 4 described in the first embodiment. It should be noted that, in the present embodiment, a case where an impedance value $Z(\omega_1)$ obtained at one frequency $\omega_1$ is judged to be unusable if belonging to a non-arc region $L_{nc}$ and judged to be usable if belonging to an arc region $L_c$ is described to simplify description. However, the scope of the present embodiment is not limited to this.

Figure 22:
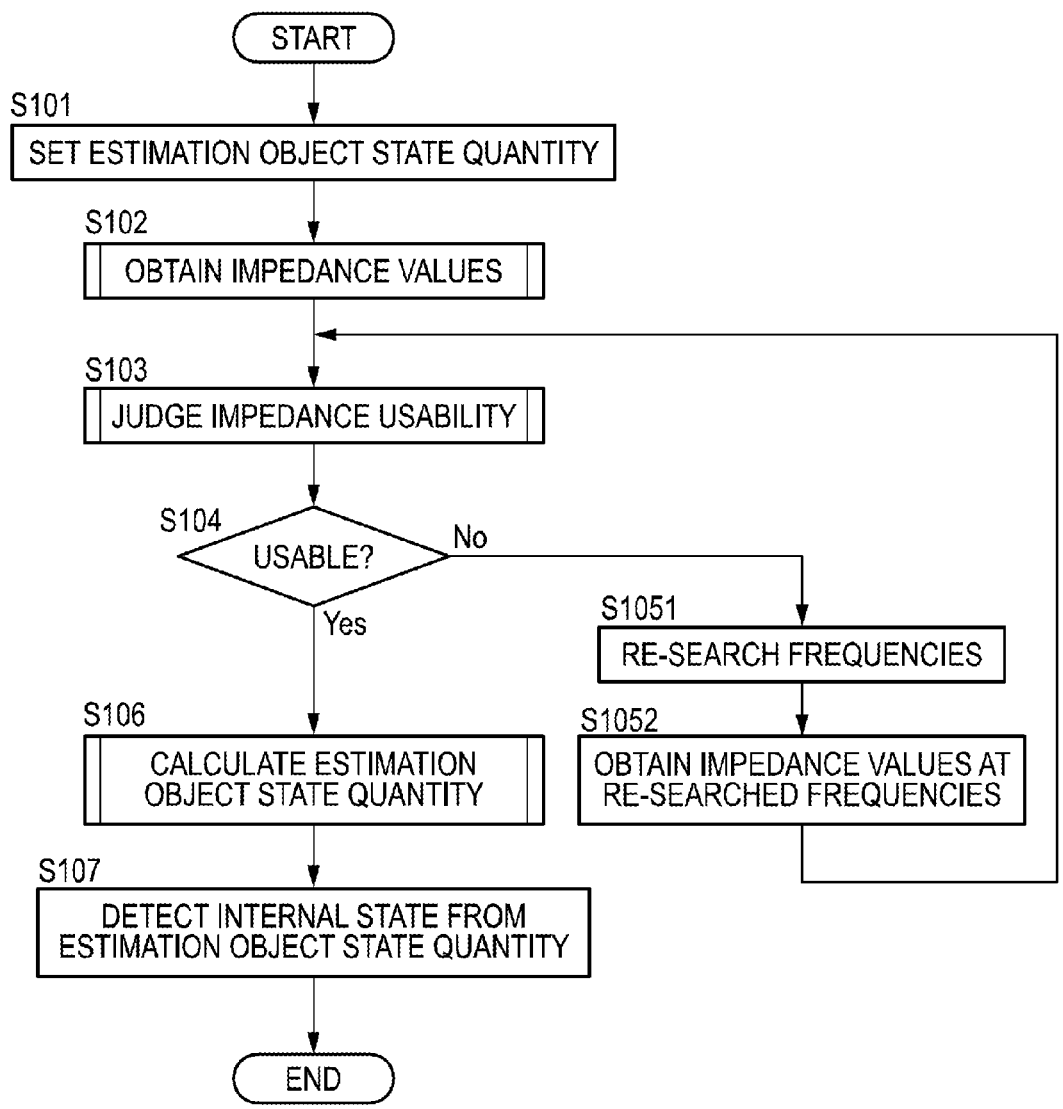
FIG. 22 is a flow chart showing the flow of a fuel cell internal state detection system according to one embodiment.

FIG. 22 is a flow chart showing the flow of specific processes of an unusable-scene process according to the present embodiment. Particularly, characteristic steps in FIG. 22 as compared to FIG. 4 are Steps S1051 and S1052.

Specifically, in Step S1051, new frequencies $\omega_{1-2}$, $\omega_{1-3}$ and $\omega_{1-4}$ gradually smaller than the frequency $\omega_1$ are searched after Step S104 in which the impedance value $Z(\omega_1)$ corresponding to the frequency $\omega_1$ is judged to be unusable since it belongs to the non-arc region $L_{nc}$ as described above.

Then, in Step S1052, impedance values $Z(\omega_{1-2})$, $Z(\omega_{1-3})$ and $Z(\omega_{1-4})$ respectively corresponding to the above frequencies $\omega_{1-2}$, $\omega_{1-3}$ and $\omega_{1-4}$ are obtained. It should be noted that the impedance values are obtained by a method, for example, similar to the one described with reference to FIG. 6.

Figure 23:
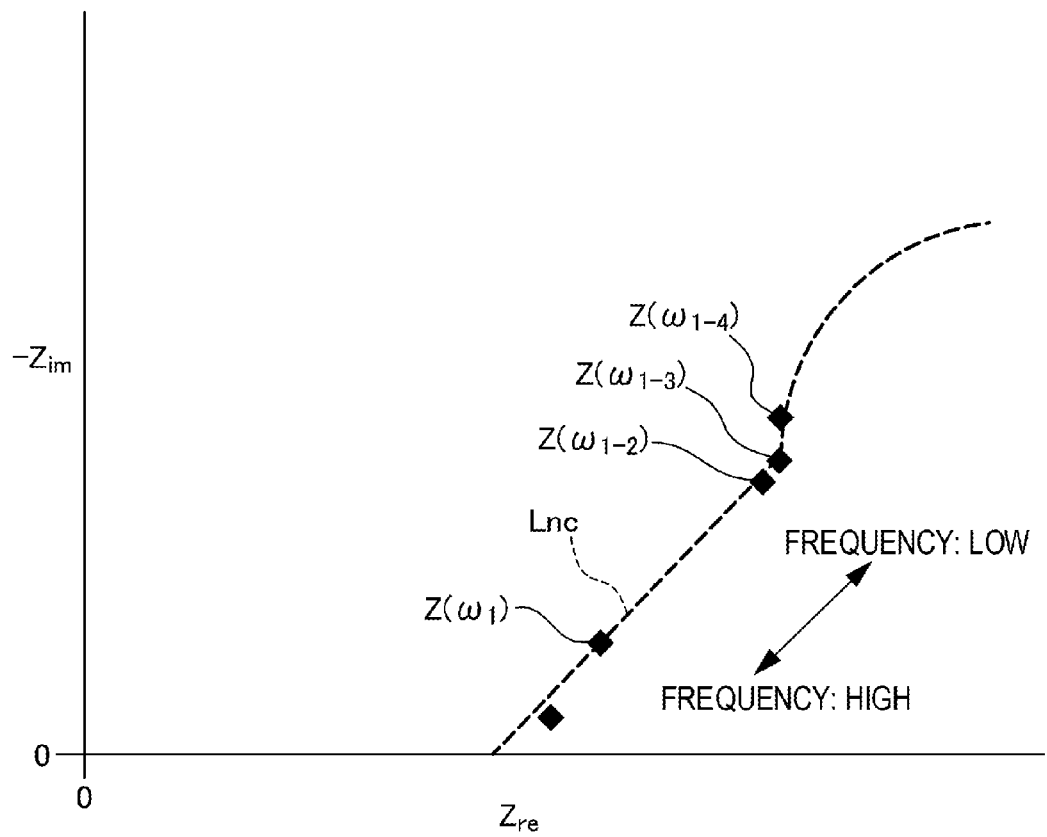
FIG. 23 is a graph showing the re-searching of a frequency and the re-obtaining of impedance values.

FIG. 23 is a graph showing the re-searching of the frequencies and the re-obtaining of the impedance values. It should be noted that the non-arc region $L_{nc}$ of the impedance curve is virtually shown by a broken line for the convenience of description also in FIG. 23.

As shown in FIG. 23, since the impedance value $Z(\omega_1)$ corresponding to the frequency $\omega_1$ belongs to the non-arc region $L_{nc}$ in the present embodiment, the corresponding impedance values $Z(\omega_{1-2})$, $Z(\omega_{1-3})$ and $Z(\omega_{1-4})$ are obtained at the new gradually smaller frequencies $\omega_{1-2}$, $\omega_{1-3}$ and $\omega_{1-4}$ (i.e. gradually closer to the left side of FIG. 23).

Then, a return is made to Step S103 and impedance usability is judged by determining whether or not the re-obtained impedance values $Z(\omega_{1-2})$, $Z(\omega_{1-3})$ and $Z(\omega_{1-4})$ belong the arc region $L_c$.

Here, a determination on whether the impedance values belong to the arc region $L_c$ can be made, for example, by arbitrarily selecting two impedance values from these three impedance values $Z(\omega_{1-2})$, $Z(\omega_{1-3})$ and $Z(\omega_{1-4})$ and performing any one of the process of Steps S1031 to S1036 shown in FIG. 7, the process of Steps S2031 to S2036 of FIG. 12, the process of Steps S3031 to S3036 shown in FIG. 15 and the process of Steps S4031 to S4037 or a combination of these processes for these two impedance values.

Since the impedance value $Z(\omega_{1-4})$ belongs to the arc region $L_c$ as shown in FIG. 23 in the present embodiment, the impedance value $Z(\omega_{1-4})$ is determined to belong to the arc region $L_c$, with the result that the impedance value $Z(\omega_{1-4})$ is judged to be usable in Step S104 of FIG. 22. Thus, the process after Step S106 is performed.

On the other hand, if none of the re-obtained impedance values $Z(\omega_{1-2})$, $Z(\omega_{1-3})$ and $Z(\omega_{1-4})$ are determined to belong to the arc region $L_c$ in Step S103 and these impedance values are judged to be unusable in Step S104, a return is made to Step S1051 described above and the process of searching frequencies is performed again. Such a frequency-searching process can be repeated until a usable impedance value is obtained.

According to the state detection system for the fuel cell 1 relating to the present embodiment described above, the following effects can be obtained.

In the state detection system relating to the present embodiment, the controller 6 functions as an unusable-scene process execution unit for re-searching the frequencies, at which the impedance values should be obtained, and obtaining the impedance values $Z(\omega_{1-2})$, $Z(\omega_{1-3})$ and $Z(\omega_{1-4})$ corresponding to the re-searched frequencies $\omega_{1-2}$, $\omega_{1-3}$ and $\omega_{1-4}$.

In this way, it can be more reliably prevented that the internal state of the fuel cell 1 is erroneously estimated using the impedance value $Z(\omega_1)$ judged to be unusable.

Particularly, by calculating an estimation object state quantity on the basis of the impedance value $Z(\omega_{1-4})$ re-obtained and judged to be usable, the accuracy of this estimation object state quantity is improved, which contributes to a more satisfactory operation control of the fuel cell 1.

It should be noted that, in the present embodiment, usability is judged again in Step S103 for the impedance values $Z(\omega_{1\text{-}2})$, $Z(\omega_{1\text{-}3})$ and $Z(\omega_{1\text{-}4})$ re-obtained in Step S1052 described above.

However, without limitation to this, a step of re judging usability relating to Step S103 described above may be omitted to reduce the processes by increasing a possibility that the re-obtained impedance value is usable, for example, by using re-searched frequencies changed to have larger values than the original frequency.

(Sixth Embodiment)

A sixth embodiment is described below. It should be noted that the same elements as in the first to fifth embodiments are denoted by the same reference signs and not described.

In the present embodiment, particularly when an impedance value $Z(\omega_1)$ corresponding to a frequency $\omega_1$ is judged to be unusable since it belongs to a non-arc region $L_{nc}$, an impedance value is measured again after a sensitivity-improving process for a current sensor 51 and a voltage sensor 52 relating to the measurement of the impedance value $Z(\omega_1)$ is performed in the unusable-scene process in Step S105 of FIG. 4.

Figure 24:
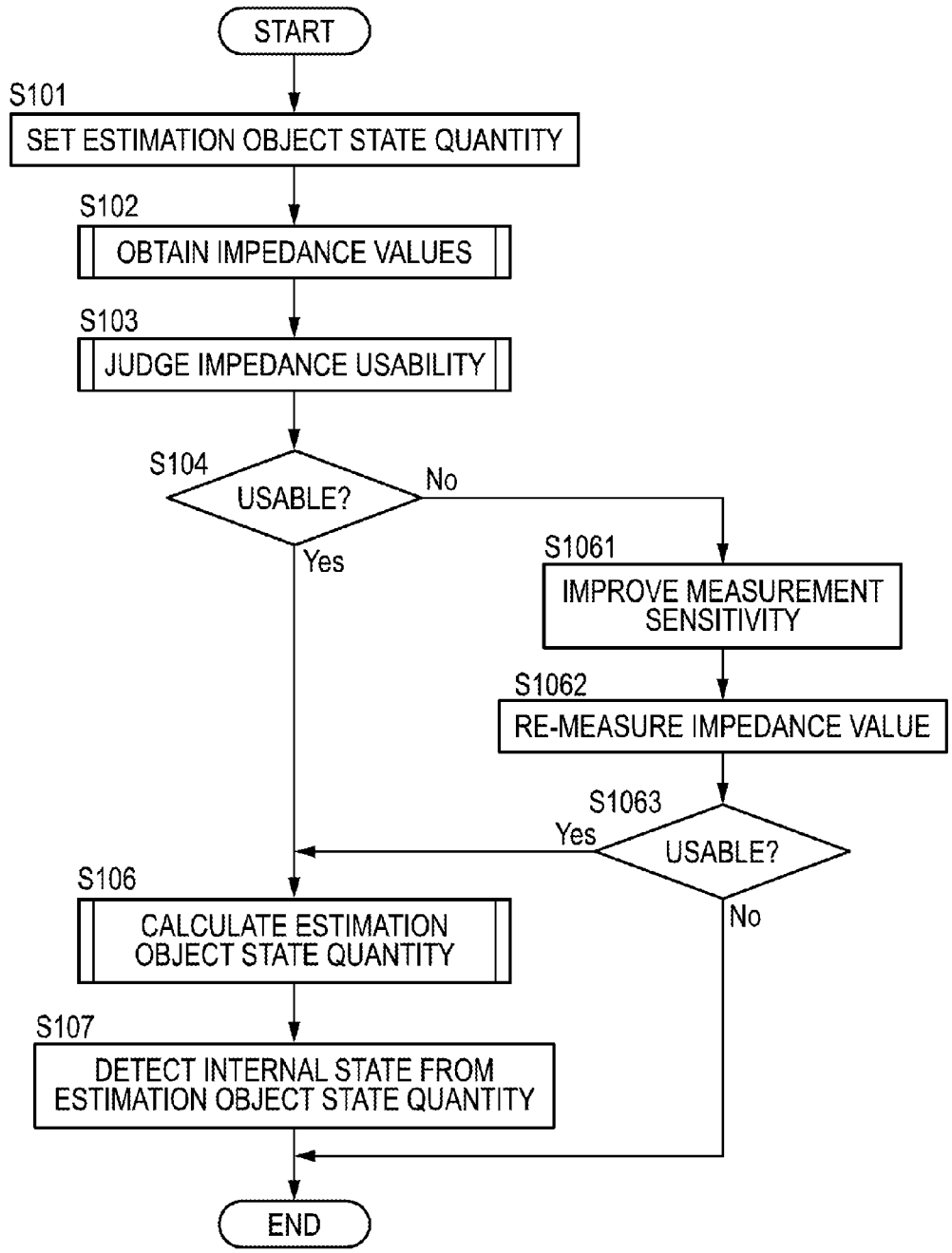
FIG. 24 is a flow chart showing the flow of a fuel cell internal state detection system according to the one embodiment.

FIG. 24 is a flow chart showing the flow of a fuel cell internal state detection system according to the present embodiment. Characteristic steps in FIG. 24 as compared to FIG. 4 are Steps S1061 to S1063.

First, a process for improving the sensitivity of the measurement of the impedance value $Z(\omega_1)$ is performed in Step S1061 after Step S104 in which the impedance value $Z(\omega_1)$ corresponding to the frequency $\omega_1$ is judged to be unusable since it belongs to the non-arc region $L_{nc}$.

Here, examples of the process for improving the sensitivity of the measurement of the impedance value $Z(\omega_1)$ include a process for improving S/N ratios of detection value signals of the current sensor 51 and the voltage sensor 52. For example, a process for increasing a voltage amplitude value or a current amplitude value to be actually applied to a fuel cell 1 is this process for improving the S/N ratios.

Figure 25:
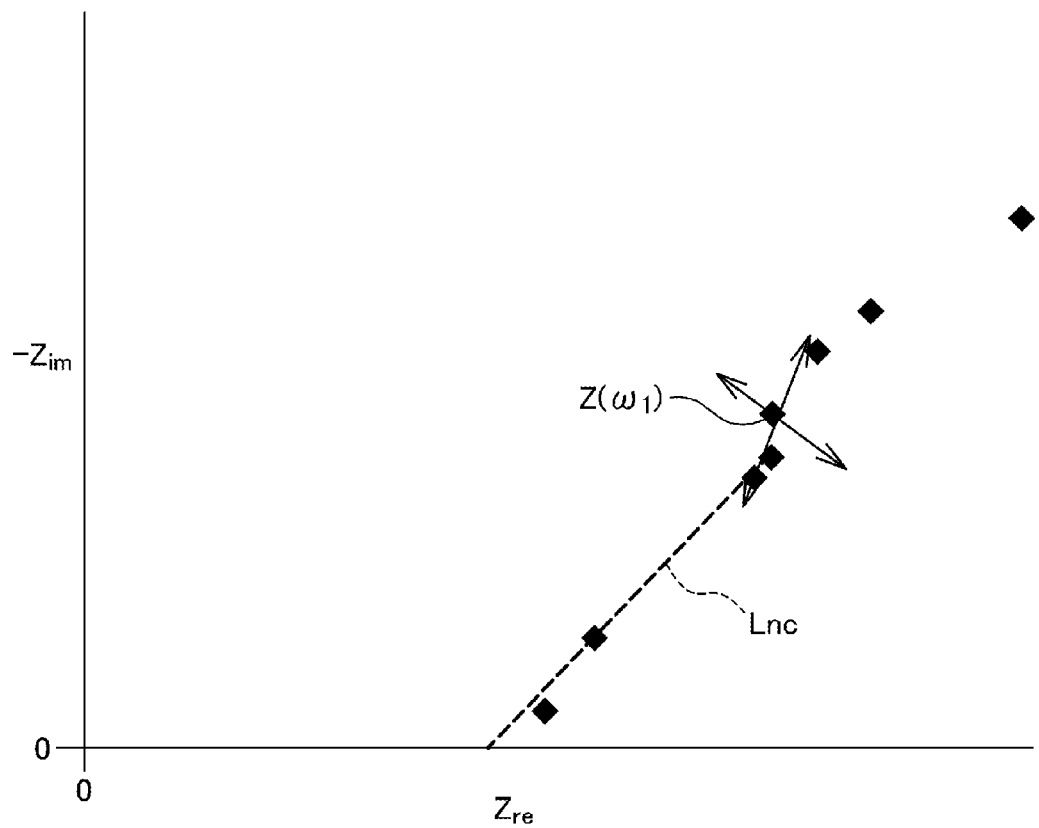
FIG. 25 is a graph showing a degree of a measurement error of an impedance value.

FIG. 25 is a graph showing a degree of a measurement error of the impedance value $Z(\omega_1)$ according to the present embodiment. It should be noted that the non-arc region $L_{nc}$ of an impedance curve is virtually shown by a broken line for the convenience of description also in FIG. 25.

As shown in FIG. 25, the impedance value $Z(\omega_1)$ actually belongs to the arc region $L_c$. However, it is possible in the present embodiment that a measurement error occurs in a range shown by arrows in FIG. 25 due to low sensitivities of the current sensor 51 and the voltage sensor 52 and the like. In this case, near the tips of the arrows of FIG. 25, there is a possibility that the impedance value $Z(\omega_1)$ is erroneously determined to belong to the non-arc region $L_{nc}$ as is understood from the presence of the arrow tip on the side of the non-arc region $L_{nc}$. Specifically, in the present embodiment, the above sensitivity-improving process is performed with a view to reducing a possibility of such an erroneous determination.

Then, the impedance value $Z(\omega_1)$ is measured again in Step S1062 after the sensitivity-improving process is performed. Here, the impedance value $Z(\omega_1)$ is measured by a method, for example, similar to the one described with reference to FIG. 6.

Subsequently, whether or not the impedance value $Z(\omega_1)$ measured again is usable is judged in Step S1063. Specifically, whether or not the impedance value $Z(\omega_1)$ belongs to the arc region $L_c$ is determined.

It should be noted that this determination can be made, for example, by arbitrarily selecting two impedance values from these three impedance values $Z(\omega_{1\text{-}2})$, $Z(\omega_{1\text{-}3})$ and $Z(\omega_{1\text{-}4})$ and performing any one of the process of Steps S1031 to S1036 shown in FIG. 7, the process of Steps S2031 to S2036 of FIG. 12, the process of Steps S3031 to S3036 shown in FIG. 15 and the process of Steps S4031 to S4037 or a combination of these processes for these two impedance values.

Whether or not the impedance value $Z(\omega_1)$ measured again is usable can be judged by determining whether or not the impedance value $Z(\omega_1)$ belongs to the arc region $L_c$. Here, if the impedance value $Z(\omega_1)$ measured again is judged to belong to the arc region $L_c$, an advance is made to Step S106 described with reference to FIG. 4 and the subsequent processes are performed.

On the other hand, if it is determined in S1063 that the impedance value $Z(\omega_1)$ belongs to the non-arc region $L_{nc}$ despite the re-measurement, the process is finished. Specifically, the impedance value $Z(\omega_1)$ judged to be unusable despite the sensitivity-improving process being performed and measurement accuracy being improved is judged to be unsuitable for the calculation of the estimation object state quantity set in Step S101, the calculation of the estimation object state quantity is given up and the process is directly finished.

It should be noted that, when the impedance value $Z(\omega_1)$ is judged to be unusable, an advance may be made to Step S107 even if the calculation of the estimation object state quantity is given up, and another value set beforehand may be used instead and each estimation object state quantity may be calculated on the basis of this value. Further, after the impedance value $Z(\omega_1)$ is judged to be unusable, the frequency re-searching process according to the above fifth embodiment may be performed. Further, a process for improving the acquisition accuracy of the impedance value $Z(\omega_1)$ may be performed and the impedance value may be measured again.

According to the state detection system for the fuel cell 1 relating to the present embodiment described above, the following effects can be obtained.

In the state detection system relating to the present embodiment, the controller 6 functions as an unusable-scene process execution unit for improving the acquisition sensitivity of the impedance value acquisition unit and re-obtaining the impedance value $Z(\omega_1)$.

Specifically, by increasing the sensitivity of an impedance measurement system such as through an improvement of the S/N ratios of the detection value signals of the current sensor 51 and the voltage sensor 52 to improve the acquisition accuracy of the impedance value $Z(\omega_1)$ and reducing the influence of an error of the measurement system, it can be prevented that the impedance value $Z(\omega_1)$ is erroneously judged to be unusable although it is usable. As a result, the accuracy of the estimation object state quantity calculated on the basis of the impedance value $Z(\omega_1)$ is improved and the detection accuracy of a more satisfactory internal state of the fuel cell 1 is further improved.

(Seventh Embodiment)

A seventh embodiment is described below. It should be noted that the same elements as in the first to sixth embodiments are denoted by the same reference signs and not described.

In the present embodiment, particularly when an impedance value $Z(\omega_1)$ corresponding to a frequency $\omega$ is judged to be unusable since it belongs to a non-arc region $L_{nc}$, a roughly estimated value of a set estimation object state quantity is set and the roughly estimated value is calculated as the estimation object state quantity in the unusable-scene process in Step S105 of FIG. 4 in the first embodiment, and the process of Step S106 in FIG. 4 is performed.

Figure 26:
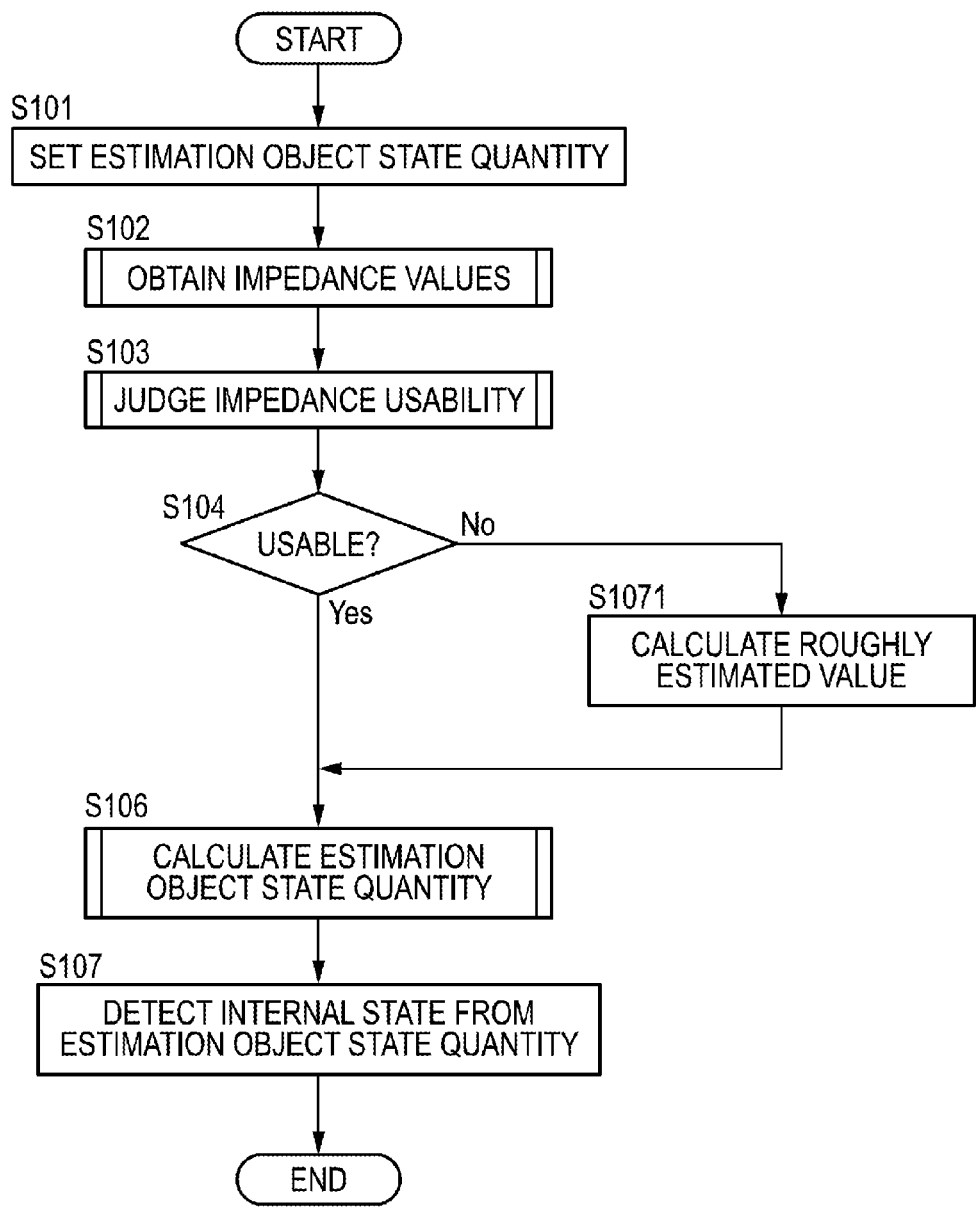
FIG. 26 is a flow chart showing the flow of a fuel cell internal state detection system according to one embodiment.

FIG. 26 is a flow chart showing the flow of a fuel cell internal state detection system according to the present embodiment. Particularly, a characteristic step in FIG. 26 as compared to FIG. 4 is Step S1071.

Specifically, a roughly estimated value of a desired state quantity is calculated in Step S1071 after Step S104 in which the impedance value $Z(\omega_1)$ corresponding to the frequency $\omega_1$ is judged to be unusable since it belongs to the non-arc region $L_{nc}$ as described above.

Here, various methods can be selected as a calculation method for the roughly estimated value. As an example, the estimation object state quantity of the fuel cell 1 is calculated as the roughly estimated value on the basis of the impedance value $Z(\omega_1)$ judged to be unusable as described above.

In this case, the calculated state quantity of the fuel cell 1 has, of course, a large error with respect to an actual value and has insufficient accuracy. However, there is a certain utility in that the value of the estimation object state quantity can be approximated and the rough internal state of the fuel cell 1 can be estimated.

On the other hand, the roughly estimated value can be calculated by another method without using the impedance value $Z(\omega_1)$ judged to be unusable. An example of such a calculation of the roughly estimated value is described for the case where an ionomer resistance value $R_{ion}$ due to catalyst layers 112A, 113A of the fuel cell 1 and the like is set as the estimation object state quantity.

Figure 27:
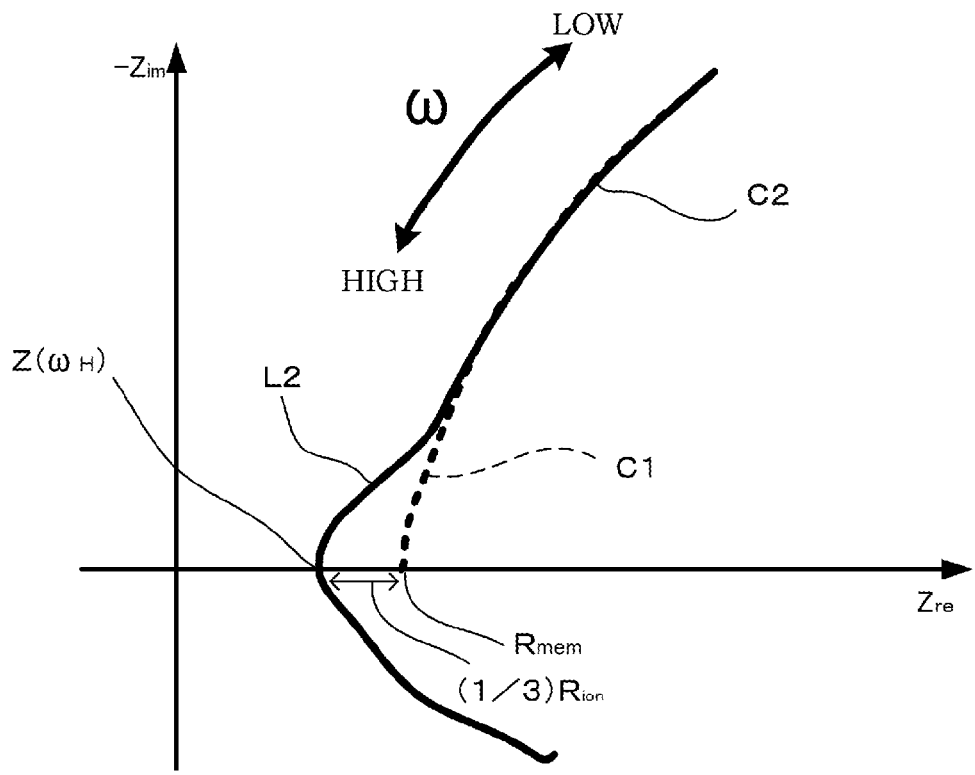
FIG. 27 is a Nyquist diagram of a fuel cell according to the one embodiment.

FIG. 27 shows an ideal impedance curve obtained from the above Equation (1) by applying actual measurement values of at least two impedance values (also written as an equivalent circuit impedance curve C1) and an impedance curve based on actual measurement values of impedances measured under predetermined conditions in advance (also written as an actually measured impedance curve C2).

As a result of earnest study on the part of the present inventors, a difference between an electrolyte membrane resistance value $R_{mem}$, which is the value of an intersection of the equivalent circuit impedance curve C1 and a real axis, and an HFR impedance value $Z(\omega_H)$, which is the value of an intersection of the actually measured impedance curve C2 and the real axis, is known to be equivalent to ⅓ of the ionomer resistance value $R_{ion}$. Thus, in the present embodiment, $3\times(R_{mem}-Z(\omega_H))$ is roughly estimated as the ionomer resistance value $R_{ion}$.

Here, $R_{mem}$, $R_{act}$ and $C_{dl}$ are unknowns in the above Equation (1), but $R_{mem}$ can be calculated if impedance values at two frequencies in a low frequency region are used. It should be noted that the ionomer resistance value $R_{ion}$ may be calculated by another method.

When the roughly estimated value is calculated, the process after Step S106 is performed.

According to the state detection system for the fuel cell 1 relating to the present embodiment described above, the following effects can be obtained.

In the state detection system relating to the present embodiment, the controller 6 functions as an unusable-scene process execution unit for causing estimation object state quantity calculation unit to calculate the roughly estimated value $R_{ion}$ as the estimation object state quantity.

In this way, the estimation object state quantity can be approximated and the rough internal state of the fuel cell 1 can be estimated. Thus, the state detection system according to the present embodiment is useful in a control system where grasping the rough internal state is sufficient.

It should be noted that, instead of the calculation of the roughly estimated value in Step S1071 in the above embodiment, the detection of the internal state may be given up when the obtained impedance value is judged to be unusable. In this way, it is possible to reliably prevent the use of the estimation object state quantity having a low accuracy and further improve the estimation accuracy of the internal state.

(Eighth Embodiment)

An eighth embodiment is described below. It should be noted that the same elements as in the first to seventh embodiments are denoted by the same reference signs and not described. In the present embodiment, there is described a case where an internal state of a fuel cell 1 to be grasped is a hydrogen amount.

Figure 28:
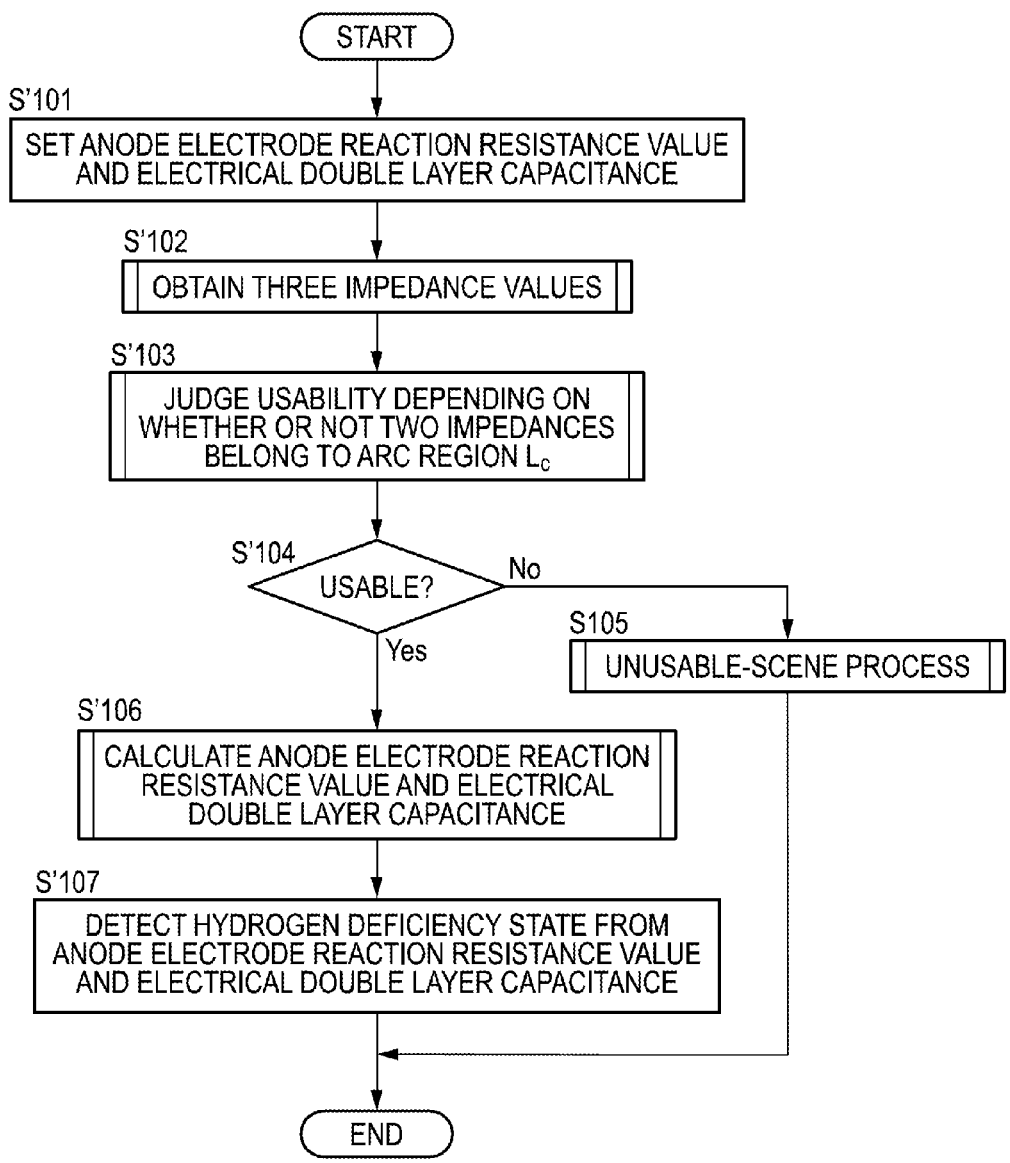
FIG. 28 is a flow chart showing the flow of a fuel cell internal state detection system according to the one embodiment.

FIG. 28 is a flow chart showing the flow of a fuel cell internal state detection system according to the present embodiment.

In Step S'101, a reaction resistance value $R_a$ of the anode electrode 112 and an electrical double layer capacitance $C_{dl}$ as indices for the detection of the hydrogen amount of the fuel cell 1 are set as estimation object state quantities. It should be noted that the reaction resistance value $R_a$ of the anode electrode 112 and the electrical double layer capacitance $C_{dl}$, which are the estimation object state quantities, are extracted from the internal state-state quantity table shown in FIG. 5 as the state quantities corresponding to the hydrogen amount of the fuel cell 1.

In Step S'102, impedance values at three frequencies $\omega_1$, $\omega_2$ and $\omega_3$ ($\omega_1<\omega_2<\omega_3$) are obtained. These frequencies $\omega_1$, $\omega_2$ and $\omega_3$ are included in a predetermined frequency band to be described later suitable for the calculation of the reaction resistance value $R_a$ of the anode electrode 112. It should be noted that a specific method for obtaining the impedance values is similar to the method shown in Steps S1021 to S1024 of FIG. 6.

Then, in Step S'103, it is detected whether or not at least two impedance values, particularly impedance values $Z(\omega_1)$ and $Z(\omega_2)$, out of impedance values $Z(\omega_1)$, $Z(\omega_2)$ and $Z(\omega_3)$ at the frequencies $\omega_1$, $\omega_2$ and $\omega_3$ belong to the arc region $L_c$.

Then, in Step S'104, the impedance values $Z(\omega_1)$ and $Z(\omega_2)$ are judged to be usable if both impedance values $Z(\omega_1)$ and $Z(\omega_2)$ belong to the arc region $L_c$, whereas the impedance values $Z(m_1)$ and $Z(\omega_2)$ are judged to be unusable if either one of the impedance values $Z(\omega_1)$ and $Z(\omega_2)$ is determined not to belong to the arc region $L_c$. Specifically, in the present embodiment, the impedance values are judged to be usable when both impedance values $Z(\omega_1)$ and $Z(\omega_2)$ belong to the arc region $L_c$.

It should be noted that a determination on whether or not each of the impedance values $Z(\omega_1)$ and $Z(\omega_2)$ belongs to the arc region can be made, for example, by performing any one of the process of Steps S1031 to S1036 shown in FIG. 7, the process of Steps S2031 to S2036 of FIG. 12, the process of Steps S3031 to S3036 shown in FIG. 15 and the process of Steps S4031 to S4037 or a combination of these processes.

Then, in Step S'106, the reaction resistance value $R_a$ of the anode electrode 112 and the electrical double layer capacitance value $C_{dl}$ are calculated on the basis of the impedance values $Z(\omega_1)$ and $Z(\omega_2)$ judged to be usable in Step S'104. An example of this calculation method is described.

First, an equation with $R_{act}$ and $C_{dl}$ as unknowns is obtained by substituting the frequencies $\omega_1$ and $\omega_2$ and imaginary components $Z_{im}(\omega_1)$ and $Z_{im}(\omega_2)$ of the impedance values $Z(\omega_1)$ and $Z(\omega_2)$ into the above Equation (3), and $R_{act}$ and $C_{dl}$ are obtained by solving this equation.

Particularly, if two coordinates are plotted at two frequencies $\omega_1$ and $\omega_2$ and a straight line is drawn through these points with $(-1/\omega Z_{im})$ taken on a vertical axis and $(1/\omega^2)$ taken on a horizontal axis for the above Equation (3) and a gradient and an intercept of this straight line are obtained, this gradient is equal to $(1/(C_{dl} \cdot R_{act}^2))$ and the intercept is equal to $(C_{dl})$. Thus, the reaction resistance value $R_{act}$ can be easily calculated. In the present embodiment, this reaction resistance value $R_{act}$ can be regarded as the reaction resistance value $R_a$ of the anode electrode 112.

It should be noted that since the reaction resistance value $R_{act}$ obtained on the basis of the above Equation (3) is thought to normally include not only a component of the reaction resistance value $R_a$ of the anode electrode 112, but also a component of a reaction resistance value $R_c$ of the cathode electrode 113, it is not necessarily appropriate to estimate the reaction resistance value $R_{act}$ as the reaction resistance value $R_a$ of the anode electrode 112.

However, as a result of earnest study on the part of the present inventors, it is found that there is such a predetermined frequency band where a value of a certain reliability is obtained in detecting the hydrogen amount even if the reaction resistance value $R_{act}$ obtained on the basis of the above Equation (3) is estimated as the reaction resistance value $R_a$ of the anode electrode 112.

Specifically, this frequency band includes frequencies at which a difference between the reaction resistance value $R_{act}$ obtained on the basis of the above Equation (3) at the time of hydrogen deficiency in which the hydrogen amount is relatively small and the reaction resistance value $R_{act}$ obtained on the basis of the above Equation (3) at the time of oxygen deficiency in which the oxygen amount is relatively small is a certain value or larger. Generally speaking, this frequency band is a frequency band in which the reaction resistance value $R_{act}$ varies in a highly correlated manner only in response to the excess and deficiency of hydrogen gas. This frequency band is, for example, 10 Hz to 100 Hz, more preferably 20 Hz to 50 Hz and most preferably near 30 Hz. Thus, if the impedance values $Z(\omega_1)$ and $Z(\omega_2)$ are measured in such a frequency band, the hydrogen amount can be highly accurately detected even if the reaction resistance value $R_{act}$ obtained from Equation (3) is regarded as the reaction resistance value $R_a$ of the anode electrode 112.

Then, in Step S'107, the hydrogen amount of the fuel cell 1 is detected from the calculated reaction resistance value $R_a$ of the anode electrode 112 and electrical double layer capacitance value $C_{dl}$. A specific method for this detection is, for example, as follows. A relationship between the reaction resistance value $R_a$ and the electrical double layer capacitance value $C_{dl}$ and the hydrogen amount of the fuel cell 1 is stored as a table in advance through an experiment or the like, and the actual hydrogen amount of the fuel cell 1 can be detected by referring to this table according to the calculated reaction resistance value $R_a$ of the anode electrode 112 and electrical double layer capacitance value $C_{dl}$.

Further, a binary detection mode may be employed in which threshold values for the reaction resistance value $R_a$ of the anode electrode 112 and the electrical double layer capacitance value $C_{dl}$ serve as bases for the detection of a hydrogen deficiency state due to the deficiency of the hydrogen amount, and hydrogen deficiency is detected when the calculated reaction resistance value $R_a$ and electrical double layer capacitance value $C_{dl}$ exceed the threshold values and sufficient hydrogen is detected when they do not.

On the other hand, if it is judged in Step S'104 described above that either one of the impedance values $Z(\omega_1)$ and $Z(\omega_2)$ does not belong to the arc region $L_c$, an advance may be made to Step S105 and the unusable-scene process described in the fifth to seventh embodiments is performed.

According to the state detection system for the fuel cell 1 relating to the present embodiment described above, the following effects can be obtained.

In the state detection system relating to the present embodiment, the controller 6 functions as an an estimation object state quantity setting unit configured to set the reaction resistance value $R_a$ of the anode electrode 112 and the electrical double layer capacitance value $C_{dl}$ as the estimation object state quantities when the internal state to be detected is the hydrogen amount.

According to this, the reaction resistance value $R_a$ and the electrical double layer capacitance value $C_{dl}$, which are suitable state quantities as the indices of the hydrogen amount of the fuel cell 1, can be set and it can be judged whether or not the obtained impedance values $Z(\omega_1)$, $Z(\omega_2)$ are usable for the calculation of the reaction resistance value $R_a$ and the electrical double layer capacitance value $C_{dl}$. As a result, this contributes to highly accurate detection of the hydrogen amount of the fuel cell 1.

It should be noted that although both the reaction resistance value $R_a$ of the anode electrode 112 and the electrical double layer capacitance value $C_{dl}$ are set as the estimation object state quantities corresponding to the hydrogen amount serving as the internal state in the present embodiment, only either one of the reaction resistance value $R_a$ and the electrical double layer capacitance value $C_{dl}$ may be set as the estimation object state quantity.

(Ninth Embodiment)

A ninth embodiment is described below. It should be noted that the same elements as in the first to eighth embodiments are denoted by the same reference signs and not described. In the present embodiment, there is described a case where an internal state of a fuel cell 1 to be grasped is a wet/dry state (degree of wetness). Specifically, in the present embodiment, it can be detected whether or not the fuel cell 1 is in a dry state.

Figure 29:
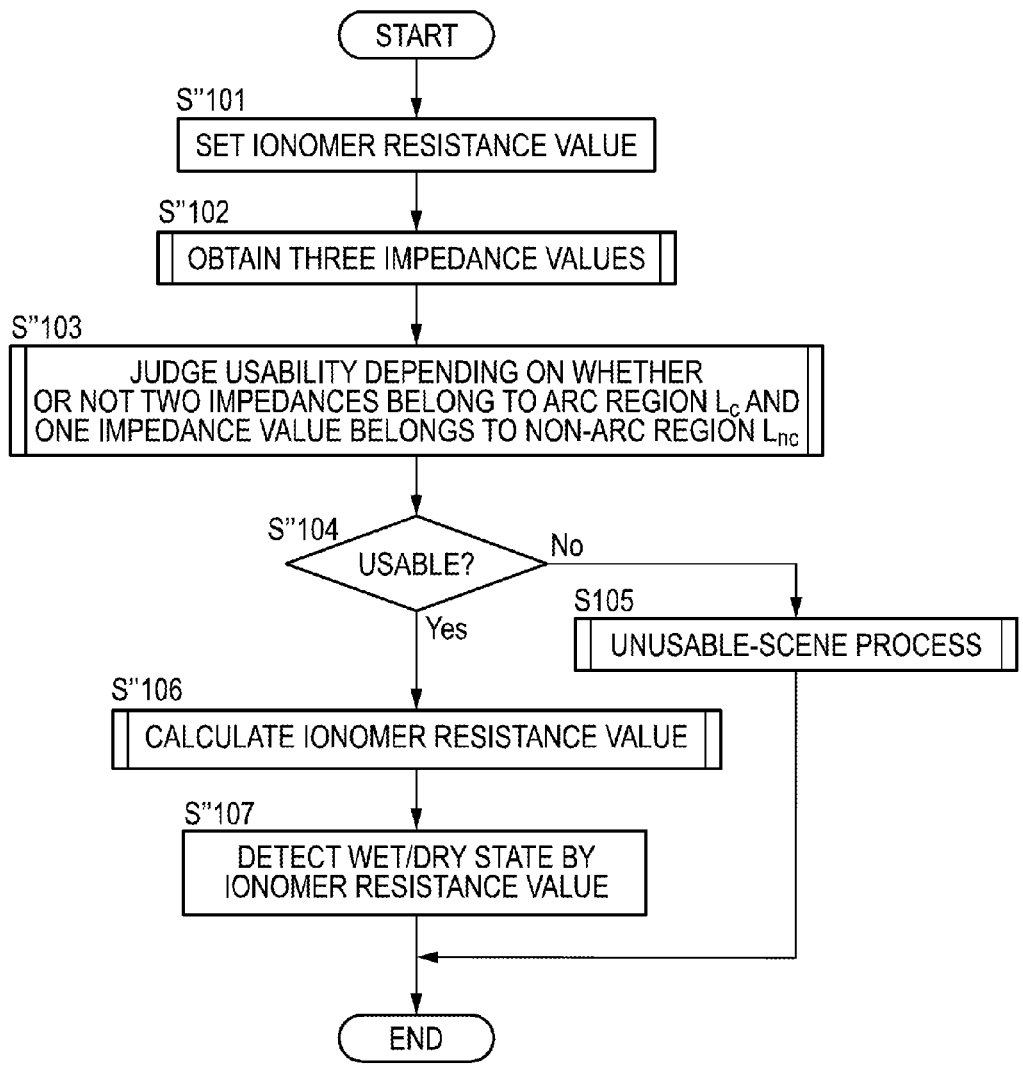
FIG. 29 is a flow chart showing the flow of a fuel cell internal state detection system according to the one embodiment.

FIG. 29 is a flow chart showing the flow of a fuel cell internal state detection system according to the present embodiment.

In Step S"101, an ionomer resistance value $R_{ion}$ serving as an index for the detection of the degree of wetness of the fuel cell 1 are set as an estimation object state quantity. It should be noted that this ionomer resistance value $R_{ion}$, which is the estimation object state quantity, is extracted from the internal state-state quantity table shown in FIG. 5 as the state quantity corresponding to the degree of wetness of the fuel cell 1.

Subsequently, in Step S"102, impedance values at three frequencies $\omega_1$ $\omega_2$ and $\omega_3$ are obtained. It should be noted that a specific method for obtaining the impedance values is similar to the method shown in Steps S1021 to S1024 of FIG. 6.

Then, in Step S"103, it is detected whether or not at least two impedance values, particularly impedance values $Z(\omega_1)$ and $Z(\omega_2)$, out of impedance values $Z(\omega_1)$, $Z(\omega_2)$ and $Z(\omega_3)$ at a plurality of frequencies $\omega_1$, $\omega_2$ and $\omega_3$ belong to the arc region $L_c$. It should be noted that a determination on whether or not each of the impedance values $Z(\omega_1)$ and $Z(\omega_2)$ belongs to the arc region $L_c$ can be made, for example, by performing any one of the process of Steps S1031 to S1036 shown in FIG. 7, the process of Steps S2031 to S2036 of FIG. 12, the process of Steps S3031 to S3036 shown in FIG. 15 and the process of Steps S4031 to S4037 or a combination of these processes.

Then, in Step S"104, the impedance values $Z(\omega_1)$ and $Z(\omega_2)$ are judged to be usable and an advance is made to Step S"106 if both impedance values $Z(\omega_1)$ and $Z(\omega_2)$ belong to the arc region $L_c$, whereas the impedance values $Z(\omega_1)$ and $Z(\omega_2)$ are judged to be unusable if either one of the impedance values $Z(\omega_1)$ and $Z(\omega_2)$ is determined not to belong to the arc region $L_c$.

Then, in Step S"106, the ionomer resistance value $R_{ion}$ is calculated on the basis of the impedance values $Z(\omega_1)$ and $Z(\omega_2)$ judged to be usable in Step S"104 and an HFR impedance value $Z(\omega_H)$ measured in advance.

It should be noted that, in the present embodiment, the ionomer resistance value $R_{ion}$ is given by tripling a value obtained by subtracting the HFR impedance value $Z(\omega_H)$ from an electrolyte membrane resistance value $R_{mem}$, obtained on the basis of the impedance values $Z(\omega_1)$ and $Z(\omega_2)$ (see FIG. 27).

Then, in Step S"107, the degree of wetness of the fuel cell 1 is detected from the calculated ionomer resistance value $R_{ion}$. A specific method for this detection is, for example, as follows. A relationship between the ionomer resistance value $R_{ion}$ and the degree of wetness serving as an index of the wet/dry state of the fuel cell 1 is stored as a table, for example, through an experiment or the like in advance, and the actual degree of wetness of the fuel cell 1 can be detected by referring to this table according to the calculated ionomer resistance value $R_{ion}$.

Further, a binary detection mode may be employed in which a specific ionomer resistance value $R_{ion}$ serving as a basis for the detection that the fuel cell 1 is in an excessively dry state or in an excessively wet state is determined as a threshold value, and the excessively dry state or excessively wet state is detected when the calculated value of the ionomer resistance value $R_{ion}$ exceeds this threshold value.

On the other hand, if it is judged in Step S"104 described above that either one of the impedance values $Z(\omega_1)$ and $Z(\omega_2)$ does not belong to the arc region $L_c$, an advance is made to Step S105 and the unusable-scene process described in the fifth to seventh embodiments is performed.

According to the state detection system for the fuel cell 1 relating to the present embodiment described above, the following effects can be obtained.

In the state detection system relating to the present embodiment, the controller 6 functions as an an estimation object state quantity setting unit configured to set the ionomer resistance value $R_{ion}$ as the estimation object state quantity when the internal state to be detected is the degree of wetness.

According to this, the ionomer resistance value $R_{ion}$, which is a suitable state quantity as the index of the wet/dry state of the fuel cell 1, can be set, and it can be judged whether or not the obtained impedance values $Z(\omega_1)$, $Z(\omega_2)$ are usable for the calculation of the ionomer resistance value $R_{ion}$. As a result, this contributes to the highly accurate detection of the wet/dry state of the fuel cell 1.

It should be noted that although the ionomer resistance value $R_{ion}$ is set as the suitable estimation object state quantity, which is an index of the wet/dry state of the fuel cell 1, in the present embodiment, the electrolyte membrane resistance value $R_{mem}$ may be set as the estimation object state quantity. In this case, the HFR impedance value $Z(\omega_H)$ may be particularly used as an approximate equivalent to the electrolyte membrane resistance value $R_{mem}$.

As just described, a computation amount of the controller 6 can be reduced to reduce a burden on thereof by using the relatively easily calculated HFR impedance value $Z(\omega_H)$ as an equivalent to the electrolyte membrane resistance value $R_{mem}$.

(Tenth Embodiment)

A tenth embodiment is described below. It should be noted that the same elements as in the first to ninth embodiments are denoted by the same reference signs and not described. In the present embodiment, there is described a case where an internal state of a fuel cell 1 to be grasped is an oxygen deficiency state. Specifically, in the present embodiment, it can be detected whether or not the fuel cell 1 is in an oxygen deficiency state.

Figure 30:
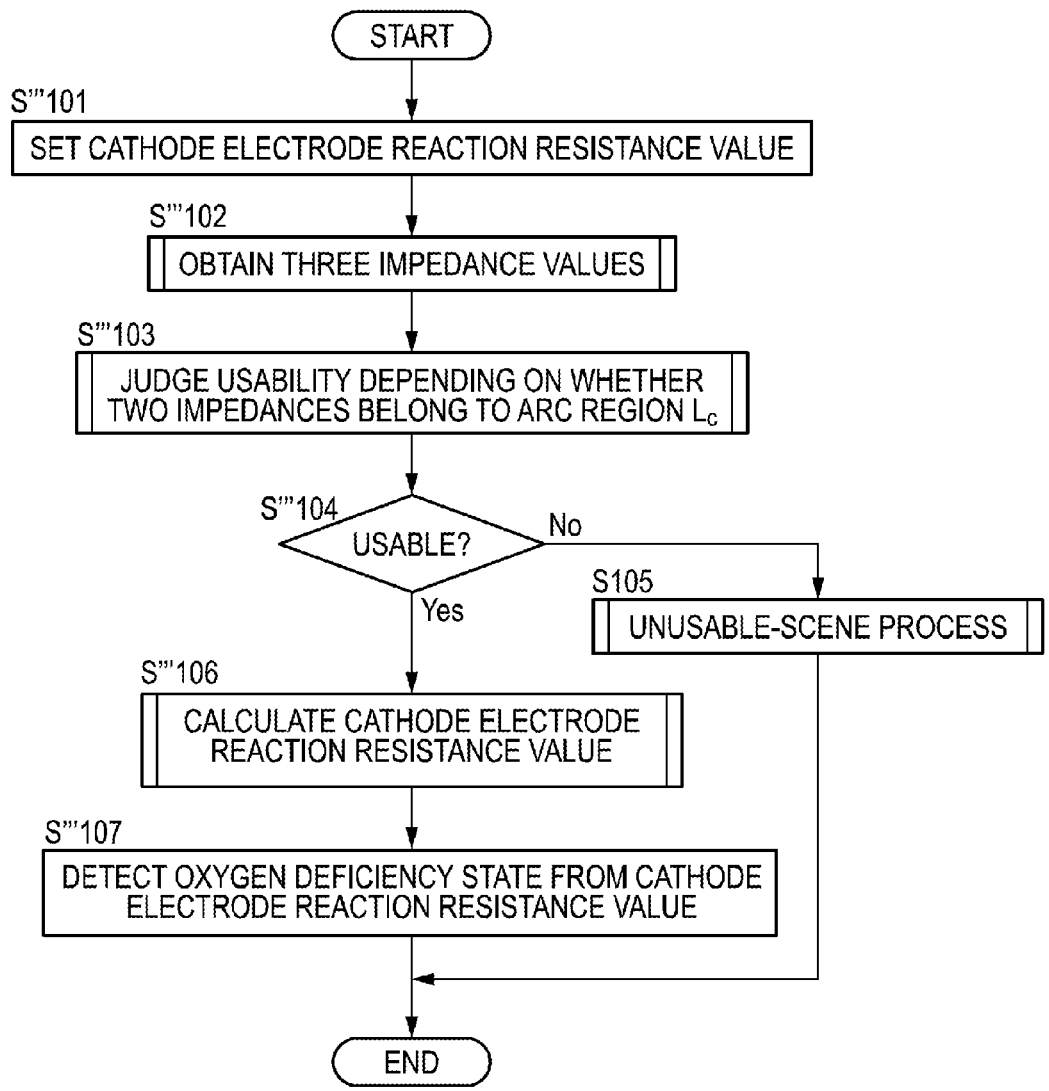
FIG. 30 is a flow chart showing the flow of a fuel cell internal state detection system according to the one embodiment.

FIG. 30 is a flow chart showing the flow of a fuel cell internal state detection system according to the present embodiment.

In Step S'''101, a reaction resistance value $R_c$ of a cathode electrode 113 serving as an index for the detection of an oxygen amount of the fuel cell 1 is set as an estimation object state quantity. It should be noted that this reaction resistance value $R_c$ of the cathode electrode 113 is extracted from the internal state-state quantity table shown in FIG. 5 as the state quantity corresponding to the oxygen amount of the fuel cell 1.

Subsequently, in Step S'''102, impedance values at three frequencies $\omega_1$, $\omega_2$ and $\omega_3$ are obtained. These frequencies $\omega_1$, $\omega_2$ and $\omega_3$ are included in a predetermined frequency band to be described later suitable for the calculation of the reaction resistance value $R_c$ of the cathode electrode 113. It should be noted that a specific method for obtaining the impedance values is similar to the method shown in Steps S1021 to S1024 of FIG. 6.

Then, in Step S'''103, it is detected whether or not at least two impedance values, particularly impedance values $Z(\omega_1)$ and $Z(\omega_2)$, out of impedance values $Z(\omega_1)$, $Z(\omega_2)$ and $Z(\omega_3)$ at the frequencies $\omega_1$, $\omega_2$ and $\omega_3$ belong to the arc region $L_c$. It should be noted that a determination on whether or not each of the impedance values $Z(\omega_1)$ and $Z(\omega_2)$ belongs to the arc region $L_c$ can be made, for example, by performing any one of the process of Steps S1031 to S1036 shown in FIG. 7, the process of Steps S2031 to S2036 of FIG. 12, the process of Steps S3031 to S3036 shown in FIG. 15 and the process of Steps S4031 to S4037 or a combination of these processes.

Then, in Step S'''104, the impedance values $Z(\omega_1)$ and $Z(\omega_2)$ are judged to be usable if both impedance values $Z(\omega_1)$ and $Z(\omega_2)$ belong to the arc region $L_c$, whereas the impedance values $Z(\omega_1)$ and $Z(\omega_2)$ are judged to be unusable if either one of the impedance values $Z(\omega_1)$ and $Z(\omega_2)$ is judged not to belong to the arc region $L_c$.

Then, in Step S'''106, the reaction resistance value $R_c$ of the cathode electrode 113 is calculated on the basis of the impedance values $Z(\omega_1)$ and $Z(\omega_2)$ judged to be usable in Step S'''104. An example of this calculation method is described.

First, an equation with $R_{act}$ and $C_{dl}$ as unknowns is obtained by substituting the frequencies $\omega_1$ and $\omega_2$ and calculated imaginary components $Z_{im}(\omega_1)$ and $Z_{im}(\omega_2)$ of the impedance values $Z(\omega_1)$ and $Z(\omega_2)$ into the above Equation (3), and $R_{act}$ and $C_{dl}$ are obtained by solving this equation.

Particularly, if two coordinates are plotted at two frequencies $\omega_1$ and cot and a straight line is drawn through these points with $(-1/\omega Z_{im})$ taken on a vertical axis and $(1/\omega^2)$ taken on a horizontal axis for the above Equation (3) and a gradient and an intercept of this straight line are obtained, this gradient is equal to $(1/(C_{dl} \cdot R_{act}^2))$ and the intercept is equal to $(C_{dl})$. Thus, the reaction resistance value $R_{act}$ can be easily calculated. In the present embodiment, this reaction resistance value $R_{act}$ can be regarded as the reaction resistance value $R_c$ of the cathode electrode 113.

It should be noted that since the reaction resistance value $R_{act}$ obtained on the basis of the above Equation (3) is thought to normally include not only a component of the reaction resistance value $R_c$ of the cathode electrode 113, but also a component of a reaction resistance value $R_a$ of an anode electrode 112, it is not necessarily appropriate to estimate the reaction resistance value $R_{act}$ as the reaction resistance value $R_c$ of the cathode electrode 113.

However, as a result of earnest study on the part of the present inventors, it is found that there is such a predetermined frequency band where a certain reliability is obtained in detecting the oxygen amount even if the reaction resistance value $R_{act}$ obtained on the basis of the above Equation (3) is estimated as the reaction resistance value $R_c$ of the cathode electrode 113.

Specifically, this frequency band includes frequencies at which a difference between the reaction resistance value $R_{act}$ obtained on the basis of the above Equation (3) at the time of oxygen deficiency in which the oxygen amount is relatively small and the reaction resistance value $R_{act}$ obtained on the basis of the above Equation (3) at the time of hydrogen deficiency in which the hydrogen amount is relatively small is a certain value or larger. Generally speaking, this frequency band is a frequency band in which the reaction resistance value $R_{act}$ varies in a highly correlated manner only in response to the excess and deficiency of oxygen. This frequency band is, for example, 1 Hz to 10 Hz, more preferably near 5 Hz. Thus, if the impedance values $Z(\omega_1)$ and $Z(\omega_2)$ are measured in such a frequency band, the oxygen amount can be highly accurately detected even if the reaction resistance value $R_{act}$ obtained from Equation (3) is regarded as the reaction resistance value $R_c$ of the cathode electrode 113.

Then, in Step S'''107, the oxygen amount of the fuel cell 1 is detected from the calculated reaction resistance value $R_c$ of the cathode electrode 113. A specific method for this detection is, for example, as follows. A relationship between the reaction resistance value $R_c$ and the oxygen amount is stored as a table in advance through an experiment or the like, and the actual oxygen amount of the fuel cell 1 can be detected by referring to this table according to the calculated reaction resistance value $R_c$ of the cathode electrode 113.

Further, a binary detection mode may be employed in which a threshold value for the reaction resistance value $R_c$ of the cathode electrode 113 serving as a basis for the detection of the oxygen deficiency state due to the deficiency of the oxygen amount is determined, and oxygen deficiency is detected when the calculated value of the reaction resistance value $R_c$ exceeds the threshold value and sufficient oxygen is detected when it does not.

On the other hand, if it is judged in Step S'''104 described above that either one of the impedance values $Z(\omega_1)$ and $Z(\omega_2)$ does not belong to the arc region $L_c$, an advance may be made to Step S105 and the unusable-scene process described in the fifth to seventh embodiments is performed.

According to the state detection system for the fuel cell 1 relating to the present embodiment described above, the following effects can be obtained.

In the state detection system relating to the present embodiment, the controller 6 functions as an an estimation object state quantity setting unit configured to set the reaction resistance value $R_c$ of the cathode electrode 113 as the estimation object state quantity when the internal state to be detected is the oxygen amount.

According to this, the reaction resistance value $R_c$, which is a suitable state quantity as the index of the oxygen amount of the fuel cell 1, can be set and it can be judged whether or not the obtained impedance values $Z(\omega_1)$, $Z(\omega_2)$ are usable for the calculation of the reaction resistance value $R_c$. As a result, this contributes to the highly accurate detection of the oxygen amount of the fuel cell 1.

(Eleventh Embodiment)

An eleventh embodiment is described below. It should be noted that the same elements as in the first to tenth embodiments are denoted by the same reference signs and not described. In the present embodiment, in impedance measurement, a so-called excitation current application method for supplying a current I to a fuel cell 1 from a measurement current source and measuring an impedance $Z=V/I$ on the basis of this supplied current I and a voltage V to be output is carried out instead of a configuration for superimposing an alternating-current signal on an output current and an output voltage of the fuel cell 1.

In the present embodiment, in the impedance measurement of the fuel cell 1 carried out in the first embodiment or the like, the so-called excitation current application method for supplying a current I to the fuel cell 1 from a predetermined measurement current source and calculating an impedance $Z=V/I$ on the basis of this supplied current I and a voltage V to be output is carried out instead of a configuration for measuring an output current I and an output voltage V superimposed with an alternating-current signal.

Figure 31:
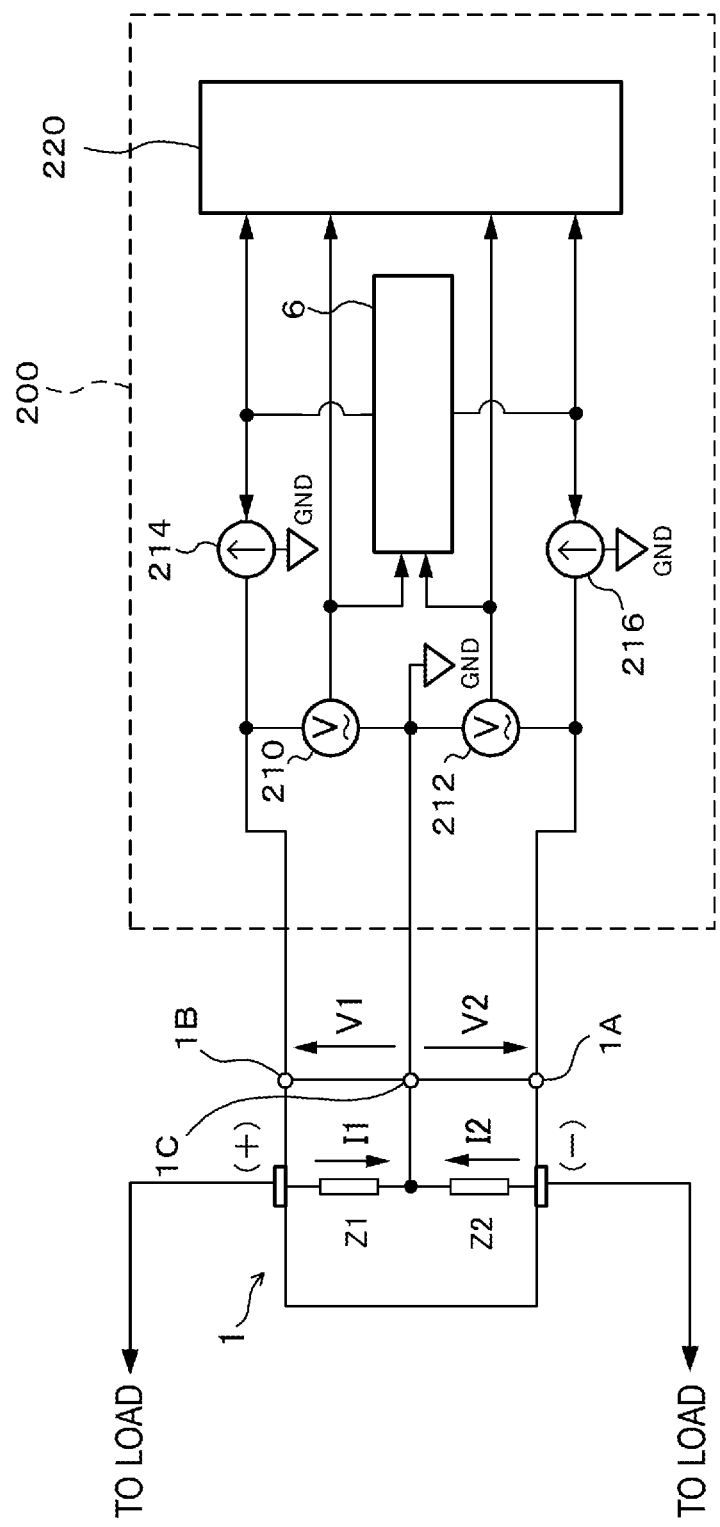
FIG. 31 is a diagram showing an impedance measurement by a so-called excitation current application method in a fuel cell system according to the one embodiment.

FIG. 31 is a system diagram schematically showing an essential part relating to impedance measurement in a fuel cell system 100 of the present embodiment.

As shown in FIG. 31, the fuel cell system 100 according to the present embodiment includes an applied alternating current adjusting unit 200 for applying an alternating current to the fuel cell 1 while adjusting the alternating current.

The applied alternating current adjusting unit 200 is connected to an intermediate terminal 1C as well as a positive electrode terminal (cathode electrode side terminal) 1B and a negative electrode terminal (anode electrode side terminal) 1A of the fuel cell 1 configured as a stack. It should be noted that a part connected to the intermediate terminal 1C is grounded as shown in FIG. 31.

The applied alternating current adjusting unit 200 includes a positive-electrode side voltage measuring sensor 210 for measuring a positive-electrode side alternating current potential difference V1 of the positive electrode terminal 1B with respect to the intermediate terminal 1C and a negative-electrode side voltage measuring sensor 212 for measuring a negative-electrode side alternating current potential difference V2 of the negative electrode terminal 1A with respect to the intermediate terminal 1C.

Further, the applied alternating current adjusting unit 200 includes a positive-electrode side alternating current power supply unit 214 for applying an alternating current I1 to a circuit composed of the positive electrode terminal 1B and the intermediate terminal 1C, a negative-electrode side alternating current power supply unit 216 for applying an alternating current I2 to a circuit composed of the negative electrode terminal 1A and the intermediate terminal 1C, a controller 6 for adjusting amplitudes and phases of these alternating currents I1 and I2, and a computation unit 220 for computing the impedance Z of the fuel cell 1 on the basis of the positive-electrode side alternating current potential differences V1, the negative-electrode side alternating current potential difference V2, and the alternating currents I1, I2.

In the present embodiment, the controller 6 adjusts the amplitudes and phases of the alternating currents I1, I2 so that the positive-electrode side alternating current potential difference V1 and the negative-electrode side alternating current potential difference V2 become equal.

Further, the computation unit 220 has hardware such as an unillustrated AD converter and a microcomputer chip and software configuration such as a program for calculating the impedance, calculates an impedance Z1 from the intermediate terminal 1C to the positive electrode terminal 1B by dividing the positive-electrode side alternating current potential difference V1 by the alternating current I1 and calculates an impedance Z2 from the intermediate terminal 1C to the negative electrode terminal 1A by dividing the negative-electrode side alternating current potential difference V2 by the alternating current I2. Further, the computation unit 220 calculates the total impedance Z of the fuel cell 1 by taking the sum of the impedances Z1 and Z2.

According to the state detection device for the fuel cell 1 relating to the present embodiment described above, the following effects can be achieved.

The fuel cell internal state detection system relating to the present embodiment includes the alternating current power supply units 214, 216 connected to the fuel cell 1 and configured to output the alternating currents I1, I2 to the fuel cell 1, the controller 6 serving as an alternating current adjusting unit for adjusting the alternating currents I1 and I2 on the basis of the positive-electrode side alternating current potential difference V1, which is a potential difference obtained by subtracting a potential of the intermediate part 1C from a potential on the positive-electrode side 1B of the fuel cell 1, and the negative-electrode side alternating current potential difference V2, which is a potential difference obtained by subtracting the potential of the intermediate part 1C from a potential on the negative-electrode side 1A of the fuel cell 1, and the impedance computation unit 220 for computing the impedance Z of the fuel cell 1 on the basis of the adjusted alternating currents I1, I2 and the positive-electrode side alternating current potential difference V1 and the negative-electrode side alternating current potential difference V2.

The controller 6 adjusts the amplitudes and phases of the alternating current I1 applied by the positive-electrode side alternating current power supply unit 214 and the alternating current I2 applied by the negative-electrode side alternating current power supply unit 216 so that the positive-electrode side alternating current potential difference V1 on the positive-electrode side of the fuel cell 1 and the negative-electrode side alternating current potential difference V2 on the negative-electrode side substantially match. Since the amplitude of the positive-electrode side alternating current potential difference V1 and that of the negative-electrode side alternating current potential difference V2 become equal in this way, the positive electrode terminal 1B and the negative electrode terminal 1A are substantially at an equal potential. Thus, the flow of the alternating currents I1, I2 for impedance measurement to a travel motor 53 is prevented, and power generation by the fuel cell 1 is therefore prevented from being affected.

Further, in the case of conducting a measurement when the fuel cell 1 is in a power generation state in impedance measurement according to the present embodiment, an alternating current potential for measurement is superimposed on a voltage generated by the power generation. Thus, the values of the positive-electrode side alternating current potential difference V1 and the negative-electrode side alternating current potential difference V2 themselves increase.

However, since the phases and amplitudes of the positive-electrode side alternating current potential difference V1 and the negative-electrode side alternating current potential difference V2 themselves are not changed, a highly accurate impedance measurement can be conducted as when the fuel cell 1 is not in the power-generating state.

Although the embodiments of the present invention have been described above, the above embodiments are merely an illustration of some application examples of the present invention and not intended to limit the technical scope of the present invention to the specific configurations of the above embodiments.

For example, an arbitrary combination of the elements of the above first to eleventh embodiments is included within the scope of the gist of the present invention.

Further, although the case of obtaining the impedance values at three frequencies is described to simplify description in each of the above embodiments, there is no limitation to this. Each step relating to the above embodiments may be performed by obtaining impedance values for four or more frequencies and appropriately selecting the impedance value to be judged for usability out of these impedance values.

Furthermore, although the straight lines L2 to L4 and the circles CY1, CY2 are drawn on the basis of two impedance values on the complex plane in the above embodiments, there is no limitation to this and these straight lines L2 to L4 and the circles CY1, CY2 may be drawn on the basis of three or more impedance values. In this case, an optimal straight line or circle may be determined on the basis of the three or more impedance values by applying an approximation method such as a least squares method.

The invention claimed is:

1. A fuel cell internal state detection system for detecting an internal state of a fuel cell on the basis of an impedance value of the fuel cell, comprising a controller programmed to:
    set an estimation object state quantity as an index of the internal state;
    obtain the impedance value of the fuel cell;
    judge whether or not the obtained impedance value is usable for a calculation of the estimation object state quantity;
    calculate the estimation object state quantity set by the controller on the basis of the obtained impedance value when the impedance value is judged to be usable for the calculation of the estimation object state quantity by the controller;
    perform an unusable-scene process when the impedance value is judged not to be usable for the calculation of the estimation object state quantity by the controller;
    obtain impedance values based on three or more frequencies; and
    determine whether at least one of three or more obtained impedance values belongs to an arc region or to a non-arc region in an impedance curve on a complex plane and judging whether or not the impedance value is usable according to the determination result.

2. The fuel cell internal state detection system according to claim 1, wherein:
    the controller is further programmed to judge whether at least one of the impedance values obtained at the three or more frequencies belongs to the arc region or to the non-arc region in the impedance curve by comparing the values of intersections of two or more lines obtained from two or more impedance values selected from the impedance values obtained at the three or more frequencies and a real axis with each other.

3. The fuel cell internal state detection system according to claim 1, wherein:
the controller is further programmed to judge whether at least one of the impedance values obtained at the three or more frequencies belongs to the arc region or to the non-arc region in the impedance curve by comparing two or more electrical double layer capacitance values obtained from two or more impedance values selected from the impedance values obtained at the three or more frequencies with each other.

4. The fuel cell internal state detection system according to claim 1, wherein:
the controller is further programmed to judge whether at least one of the three or more impedance values belongs to the arc region or to the non-arc region in the impedance curve by comparing two or more reaction resistance values estimated from two or more impedance values selected from the impedance values obtained at the three or more frequencies with each other.

5. The fuel cell internal state detection system according to claim 1, wherein:
the controller is further programmed to judge whether at least one of the three or more impedance values belongs to the arc region or to the non-arc region in the impedance curve by comparing the value of an intersection of a line obtained from two or more impedance values selected from the impedance values obtained at the three or more frequencies and a real axis with a high frequency impedance value obtained at a frequency in a high frequency band.

6. The fuel cell internal state detection system according to claim 1, wherein the controller is further programmed to:
re-search a frequency, at which the impedance value should be obtained, and re-obtains an impedance value corresponding to the re-searched frequency; or
improve acquisition sensitivity of the controller and re-obtain the impedance value.

7. The fuel cell internal state detection system according to claim 1, wherein:
the controller is further programmed to calculate a roughly estimated value as the estimation object state quantity.

8. The fuel cell internal state detection system according to claim 1, wherein:
the controller is further programmed to give up the detection of the internal state.

9. The fuel cell internal state detection system according to claim 1, wherein the controller is further programmed to:
set at least either one of a reaction resistance value of an anode electrode and an electrical double layer capacitance value as the estimation object state quantity when the internal state to be detected is a hydrogen amount;
set at least either one of an electrolyte membrane resistance value and an ionomer resistance value as the estimation object state quantity when the internal state to be detected is a degree of wetness; or
set a reaction resistance value of a cathode electrode as the estimation object state quantity when the internal state to be detected is an oxygen amount.

10. The fuel cell internal state detection system according to claim 1, wherein:
the fuel cell is configured as a laminated battery; and
the fuel cell internal state detection system further comprises:
an alternating current power supply unit connected to the laminated battery, the alternating current power supply unit outputting an alternating current to the laminated battery;
an alternating current adjusting unit for adjusting the alternating current on the basis of a positive-electrode side alternating current potential difference and a negative-electrode side alternating current potential difference, the positive-electrode side alternating current potential difference being a potential difference obtained by subtracting a potential of an intermediate part of the laminated battery from a potential on a positive-electrode side of the laminated battery, the negative-electrode side alternating current potential difference being a potential difference obtained by subtracting the potential of the intermediate part from a potential on a negative-electrode side of the fuel cell; and
an impedance computation unit for computing the impedance value of the fuel cell on the basis of the adjusted alternating current and the positive-electrode side alternating current potential difference and the negative-electrode side alternating current potential difference.

11. A fuel cell internal state detection method for detecting an internal state of a fuel cell on the basis of an impedance value of the fuel cell, comprising:
an estimation object state quantity setting step of setting a suitable estimation object state quantity as an index of the internal state;
an impedance value acquisition step of obtaining the impedance value of the fuel cell;
an impedance usability judging step of judging whether or not the obtained impedance value is usable for the calculation of the estimation object state quantity;
an estimation object state quantity calculation step of calculating the estimation object state quantity set in the estimation object state quantity setting step on the basis of the obtained impedance value when the impedance value is judged to be usable for the calculation of the estimation object state quantity in the impedance usability judging step; and
an unusable-scene process execution step of performing an unusable-scene process when the impedance value is judged not to be usable for the calculation of the estimation object state quantity in the impedance usability judging step,
impedance values based on three or more frequencies being obtained in the impedance value acquisition step,
whether at least one of three or more obtained impedance values belongs to an arc region or to a non-arc region in an impedance curve on a complex plane being determined and whether or not the impedance value is usable being judged according to the determination result in the impedance usability judging step.

* * * * *